US011803659B2

(12) United States Patent
Ho et al.

(10) Patent No.: US 11,803,659 B2
(45) Date of Patent: *Oct. 31, 2023

(54) SHARING INFORMATION ON A NETWORK-BASED SOCIAL PLATFORM

(71) Applicant: eBay Inc., San Jose, CA (US)

(72) Inventors: Yuan Der Ho, San Mateo, CA (US); Choon Chong, San Francisco, CA (US); Rolf Skyberg, Campbell, CA (US); Massimiliano Mancini, San Jose, CA (US); Adam Trachtenberg, San Francisco, CA (US); Trisha Lee Okubo, San Jose, CA (US); Philip Law, San Jose, CA (US)

(73) Assignee: eBay Inc., San Jose, CA (US)

( * ) Notice: Subject to any disclaimer, the term of this patent is extended or adjusted under 35 U.S.C. 154(b) by 151 days.

This patent is subject to a terminal disclaimer.

(21) Appl. No.: 17/234,621

(22) Filed: Apr. 19, 2021

(65) Prior Publication Data

US 2021/0383015 A1    Dec. 9, 2021

Related U.S. Application Data

(63) Continuation of application No. 16/534,605, filed on Aug. 7, 2019, now Pat. No. 11,106,819, which is a (Continued)

(51) Int. Cl.
*G06Q 30/00* (2023.01)
*G06F 21/62* (2013.01)
(Continued)

(52) U.S. Cl.
CPC .......... *G06F 21/6245* (2013.01); *G06F 21/31* (2013.01); *G06Q 30/02* (2013.01);
(Continued)

(58) Field of Classification Search
CPC ..... G06F 21/6245; G06F 21/31; G06Q 30/02; G06Q 30/0601; G06Q 30/0631;
(Continued)

(56) References Cited

U.S. PATENT DOCUMENTS 4,996,642 A    2/1991 Hey et al.
5,950,172 A    9/1999 Klingman
(Continued)

FOREIGN PATENT DOCUMENTS

JP    2005-044251 A    2/2005
KR    2001-0097388 A    11/2001
(Continued)

OTHER PUBLICATIONS

US 8,209,230 B2, 06/2012, Chong et al. (withdrawn)
(Continued)

*Primary Examiner* — Robert M Pond
(74) *Attorney, Agent, or Firm* — FIG. 1 Patents

(57) ABSTRACT

A system and method for sharing information on a network-based social platform is provided. An indication is received from a first user to share information regarding an item on a network-based social platform. The network-based social platform is a platform that allows the first user to communicative couple with other users of the network-based social platform. Profile information of the first user is accessed. A determination of whether the first user is authorized to share the information is made. Based on the first user being authorized, an identifier for the item is added to a list of recommended items that is accessible view the network-based social platform.

20 Claims, 14 Drawing Sheets

Related U.S. Application Data continuation of application No. 14/709,687, filed on May 12, 2015, now Pat. No. 10,984,126, which is a continuation of application No. 13/783,583, filed on Mar. 4, 2013, now Pat. No. 9,037,503, which is a continuation of application No. 13/177,341, filed on Jul. 6, 2011, now Pat. No. 8,392,271, which is a continuation of application No. 12/767,666, filed on Apr. 26, 2010, now Pat. No. 8,001,010, which is a continuation of application No. 11/963,399, filed on Dec. 21, 2007, now Pat. No. 7,720,722.

(60) Provisional application No. 60/957,645, filed on Aug. 23, 2007.

(51) Int. Cl.
  *G06Q 30/02* (2023.01)
  *G06Q 30/0601* (2023.01)
  *G06Q 50/00* (2012.01)
  *G06F 21/31* (2013.01)
  *H04L 9/40* (2022.01)
  *H04L 65/403* (2022.01)

(52) U.S. Cl.
  CPC ..... *G06Q 30/0601* (2013.01); *G06Q 30/0631* (2013.01); *G06Q 30/0633* (2013.01); *G06Q 30/0641* (2013.01); *G06Q 50/01* (2013.01); *H04L 63/102* (2013.01); *H04L 65/403* (2013.01)

(58) Field of Classification Search
  CPC ........... G06Q 30/0633; G06Q 30/0641; G06Q 50/01; H04L 63/102; H04L 65/403
  USPC ....................... 705/26, 27; 726/28
  See application file for complete search history.

(56) References Cited

U.S. PATENT DOCUMENTS

| | | | |
|---|---|---|---|
| 6,327,590 B1 | 12/2001 | Chidlovskii et al. | |
| 6,567,797 B1 | 5/2003 | Schuetze et al. | |
| 6,587,835 B1 | 7/2003 | Treyz et al. | |
| 6,604,107 B1 | 8/2003 | Wang | |
| 6,745,178 B1 | 6/2004 | Emens et al. | |
| 6,892,179 B1 | 5/2005 | Zacharia | |
| 6,925,444 B1 | 8/2005 | Mccollom et al. | |
| 6,957,199 B1 | 10/2005 | Fisher | |
| 6,968,179 B1 | 11/2005 | De Vries | |
| 7,143,089 B2 | 11/2006 | Petras et al. | |
| 7,197,475 B1 | 3/2007 | Lorenzen et al. | |
| 7,249,123 B2 | 7/2007 | Elder et al. | |
| 7,325,193 B2 | 1/2008 | Edd et al. | |
| 7,356,490 B1 | 4/2008 | Jacobi et al. | |
| 7,363,214 B2 | 4/2008 | Musgrove et al. | |
| 7,433,832 B1 | 10/2008 | Bezos et al. | |
| 7,444,297 B2 | 10/2008 | Shah | |
| 7,478,054 B1 | 1/2009 | Adams et al. | |
| 7,519,562 B1 | 4/2009 | Vander et al. | |
| 7,568,004 B2 | 7/2009 | Gottfried | |
| 7,571,121 B2 | 8/2009 | Bezos et al. | |
| 7,587,359 B2 | 9/2009 | Levy et al. | |
| 7,657,523 B2 | 2/2010 | Ebanks | |
| 7,689,916 B1 | 3/2010 | Goel et al. | |
| 7,707,122 B2 | 4/2010 | Hull et al. | |
| 7,712,035 B2 | 5/2010 | Giannini | |
| 7,716,089 B1 | 5/2010 | Gavarini | |
| 7,720,722 B2 | 5/2010 | Ho et al. | |
| 7,751,807 B2 | 7/2010 | Lin et al. | |
| 7,752,082 B2 | 7/2010 | Calabria | |
| 7,761,339 B2 | 7/2010 | Alivandi | |
| 7,783,980 B1 | 8/2010 | Herold | |
| 7,822,631 B1 | 10/2010 | Vander Mey et al. | |
| 7,881,969 B2 | 2/2011 | Wiseman et al. | |
| 7,945,482 B2 | 5/2011 | Law et al. | |
| 7,996,270 B2 | 8/2011 | Sundaresan | |
| 8,001,010 B2 | 8/2011 | Ho et al. | |
| 8,127,253 B2 | 2/2012 | Sauve et al. | |
| 8,224,897 B2 | 7/2012 | Kanazawa et al. | |
| 8,280,959 B1 | 10/2012 | Zuckerberg et al. | |
| 8,392,270 B2 | 3/2013 | Ho et al. | |
| 8,392,271 B2 | 3/2013 | Ho et al. | |
| 8,417,577 B2 | 4/2013 | Law et al. | |
| 8,438,069 B2 | 5/2013 | Chong et al. | |
| 8,560,385 B2 | 10/2013 | Atazky et al. | |
| 8,560,397 B2 | 11/2013 | Chong et al. | |
| 8,595,146 B1 | 11/2013 | Liew | |
| 8,706,560 B2 | 4/2014 | Sundaresan | |
| 8,725,573 B1 | 5/2014 | Narang et al. | |
| 8,832,132 B1 | 9/2014 | Spertus et al. | |
| 9,037,503 B2 | 5/2015 | Ho et al. | |
| 9,043,227 B2 | 5/2015 | Law et al. | |
| 9,092,819 B2 | 7/2015 | Chong et al. | |
| 9,208,517 B1 | 12/2015 | Boggie et al. | |
| 9,524,487 B1 | 12/2016 | Yagnik et al. | |
| 9,892,471 B2 | 2/2018 | Law et al. | |
| 10,339,613 B2 | 7/2019 | Law et al. | |
| 10,984,126 B2 | 4/2021 | Ho et al. | |
| 11,080,797 B2 | 8/2021 | Law et al. | |
| 11,106,819 B2 | 8/2021 | Ho et al. | |
| 2001/0044751 A1 | 11/2001 | Pugliese et al. | |
| 2002/0055868 A1 | 5/2002 | Dusevic et al. | |
| 2002/0055878 A1 | 5/2002 | Burton et al. | |
| 2002/0065787 A1 | 5/2002 | Evers et al. | |
| 2004/0172456 A1 | 9/2004 | Green et al. | |
| 2004/0177009 A1 | 9/2004 | Schrenk | |
| 2004/0225509 A1 | 11/2004 | Andre | |
| 2005/0033605 A1 | 2/2005 | Bergeron et al. | |
| 2005/0102227 A1 | 5/2005 | Solonchev | |
| 2005/0154639 A1 | 7/2005 | Zetmeir | |
| 2005/0192958 A1 | 9/2005 | Widjojo et al. | |
| 2005/0198031 A1 | 9/2005 | Pezaris et al. | |
| 2005/0276277 A1 | 12/2005 | Pace | |
| 2005/0288958 A1 | 12/2005 | Eraker et al. | |
| 2006/0026119 A1 | 2/2006 | Mirrashidi et al. | |
| 2006/0031869 A1 | 2/2006 | Bruner | |
| 2006/0085253 A1 | 4/2006 | Mengerink et al. | |
| 2006/0085259 A1 | 4/2006 | Nicholas et al. | |
| 2006/0085370 A1 | 4/2006 | Groat et al. | |
| 2006/0117378 A1 | 6/2006 | Tam et al. | |
| 2006/0143236 A1 | 6/2006 | Wu | |
| 2006/0149625 A1 | 7/2006 | Koningstein | |
| 2006/0161484 A1 | 7/2006 | Pandhe | |
| 2006/0190281 A1 | 8/2006 | Kott et al. | |
| 2006/0218153 A1 | 9/2006 | Voon et al. | |
| 2006/0235764 A1 | 10/2006 | Bamborough et al. | |
| 2006/0235873 A1 | 10/2006 | Thomas | |
| 2006/0239648 A1 | 10/2006 | Varghese | |
| 2006/0271460 A1 | 11/2006 | Hanif | |
| 2006/0293967 A1 | 12/2006 | Deluca et al. | |
| 2007/0067630 A1 | 3/2007 | Lenkov et al. | |
| 2007/0088652 A1 | 4/2007 | Firmage et al. | |
| 2007/0106551 A1 | 5/2007 | Mcgucken | |
| 2007/0130164 A1 | 6/2007 | Kembel et al. | |
| 2007/0150359 A1 | 6/2007 | Lim et al. | |
| 2007/0150368 A1 | 6/2007 | Arora et al. | |
| 2007/0156594 A1 | 7/2007 | Mcgucken | |
| 2007/0168216 A1 | 7/2007 | Lemelson | |
| 2007/0168463 A1 | 7/2007 | Rothschild | |
| 2007/0208627 A1 | 9/2007 | Abadi | |
| 2007/0211047 A1 | 9/2007 | Doan | |
| 2007/0220540 A1 | 9/2007 | Walker et al. | |
| 2007/0239552 A1 | 10/2007 | Sundaresan et al. | |
| 2007/0244769 A1 | 10/2007 | Boesel | |
| 2007/0255653 A1 | 11/2007 | Tumminaro et al. | |
| 2007/0288468 A1 | 12/2007 | Sundaresan et al. | |
| 2008/0004941 A1 | 1/2008 | Calabria | |
| 2008/0040673 A1 | 2/2008 | Zuckerberg et al. | |
| 2008/0065701 A1 | 3/2008 | Lindstrom et al. | |
| 2008/0077473 A1 | 3/2008 | Allin-bradshaw et al. | |
| 2008/0104679 A1 | 5/2008 | Craig | |
| 2008/0109239 A1 | 5/2008 | Harmon et al. | |
| 2008/0154632 A1 | 6/2008 | Jacobi et al. | |

(56) References Cited

U.S. PATENT DOCUMENTS

| | | |
|---|---|---|
| 2008/0154898 A1 | 6/2008 | Cheng et al. |
| 2008/0162157 A1 | 7/2008 | Daniluk |
| 2008/0189188 A1 | 8/2008 | Morgenstern |
| 2008/0189189 A1 | 8/2008 | Morgenstern |
| 2008/0208852 A1 | 8/2008 | Kuttikkad et al. |
| 2008/0228595 A1 | 9/2008 | Hill et al. |
| 2008/0300982 A1 | 12/2008 | Larson et al. |
| 2008/0301007 A1 | 12/2008 | Horel et al. |
| 2008/0313256 A1 | 12/2008 | Kanazawa et al. |
| 2008/0320004 A1 | 12/2008 | Jain et al. |
| 2008/0320139 A1 | 12/2008 | Fukuda et al. |
| 2009/0055285 A1 | 2/2009 | Law et al. |
| 2009/0055291 A1 | 2/2009 | Ho et al. |
| 2009/0055292 A1 | 2/2009 | Chong et al. |
| 2009/0083096 A1 | 3/2009 | Cao et al. |
| 2009/0115777 A1 | 5/2009 | Reyers Moreno |
| 2009/0228342 A1 | 9/2009 | Walker et al. |
| 2009/0265253 A1 | 10/2009 | Gabriel et al. |
| 2009/0265639 A1 | 10/2009 | Shuster |
| 2009/0271293 A1 | 10/2009 | Parkhurst et al. |
| 2009/0299819 A1 | 12/2009 | Davis, III et al. |
| 2009/0299824 A1 | 12/2009 | Barnes, Jr. |
| 2009/0319436 A1 | 12/2009 | Andra et al. |
| 2010/0023418 A1 | 1/2010 | Bader et al. |
| 2010/0049663 A1 | 2/2010 | Kane et al. |
| 2010/0070382 A1 | 3/2010 | Inghelbrecht et al. |
| 2010/0094729 A1 | 4/2010 | Gray et al. |
| 2010/0145719 A1 | 6/2010 | Williams et al. |
| 2010/0145771 A1 | 6/2010 | Fligler et al. |
| 2010/0145790 A1 | 6/2010 | Brignull et al. |
| 2010/0153378 A1 | 6/2010 | Sardesai |
| 2010/0205066 A1 | 8/2010 | Ho et al. |
| 2010/0211900 A1 | 8/2010 | Fujioka |
| 2010/0268661 A1 | 10/2010 | Levy et al. |
| 2010/0332283 A1 | 12/2010 | Ng et al. |
| 2011/0035295 A1 | 2/2011 | Lifson |
| 2011/0040602 A1 | 2/2011 | Kurani |
| 2011/0078055 A1 | 3/2011 | Faribault et al. |
| 2011/0106589 A1 | 5/2011 | Blomberg et al. |
| 2011/0145105 A1 | 6/2011 | Law et al. |
| 2011/0153451 A1 | 6/2011 | Bitz et al. |
| 2011/0173191 A1 | 7/2011 | Tsaparas et al. |
| 2011/0184780 A1 | 7/2011 | Alderson et al. |
| 2011/0246329 A1 | 10/2011 | Geisner et al. |
| 2011/0264556 A1 | 10/2011 | Ho et al. |
| 2011/0264557 A1 | 10/2011 | Ho et al. |
| 2011/0264567 A1 | 10/2011 | Clyne |
| 2012/0022978 A1 | 1/2012 | Manea et al. |
| 2012/0116905 A1 | 5/2012 | Futty et al. |
| 2012/0253966 A1 | 10/2012 | Chong et al. |
| 2012/0265635 A1 | 10/2012 | Forsblom |
| 2013/0030949 A1 | 1/2013 | Sundaresan et al. |
| 2013/0085792 A1 | 4/2013 | Klein |
| 2013/0132221 A1 | 5/2013 | Bradford et al. |
| 2013/0167168 A1 | 6/2013 | Ellis et al. |
| 2013/0179948 A1 | 7/2013 | Ho et al. |
| 2013/0191723 A1 | 7/2013 | Pappas et al. |
| 2013/0218715 A1 | 8/2013 | Sundaresan et al. |
| 2013/0226732 A1 | 8/2013 | Law et al. |
| 2013/0318180 A1 | 11/2013 | Amin et al. |
| 2013/0346239 A1 | 12/2013 | Chong et al. |
| 2014/0006389 A1 | 1/2014 | Garcia et al. |
| 2014/0082089 A1 | 3/2014 | Liew |
| 2014/0282114 A1 | 9/2014 | Walkin et al. |
| 2014/0331143 A1 | 11/2014 | Herold |
| 2015/0242652 A1 | 8/2015 | Ho et al. |
| 2015/0262315 A1 | 9/2015 | Law et al. |
| 2015/0310569 A1 | 10/2015 | Chong et al. |
| 2018/0174245 A1 | 6/2018 | Law et al. |
| 2019/0266678 A1 | 8/2019 | Law et al. |
| 2019/0362097 A1 | 11/2019 | Ho et al. |
| 2021/0319522 A1 | 10/2021 | Law et al. |

FOREIGN PATENT DOCUMENTS

| | | |
|---|---|---|
| KR | 10-1160404 B1 | 7/2012 |
| WO | 2006/050278 A2 | 5/2006 |
| WO | 2006/076472 A2 | 7/2006 |
| WO | 2006/130685 A2 | 7/2006 |
| WO | 2006/130685 A3 | 10/2007 |
| WO | 2009/025855 A1 | 2/2009 |
| WO | 2009/025856 A1 | 2/2009 |

OTHER PUBLICATIONS

"MTB Review",, Archived [Jan. 25, 1997] Retrieved from the Internet: URL: http: web.archive.org/web19970125123339 http: www.mtbr.com, Jan. 27, 2005, 9 pages.

12 Questions with Kaboodle, Retrieved from the Internet: <URL:http://www.shmula.com/230/12-questions-with-kaboodle>, Oct. 23, 2006, 7 pages.

BuyClearance.com—The Internet Clearance Superstore: Product Information, [Online], Retrieved from the Internet: URL: http: web.archive.org/web/20000124120021/www.buy.com/clearance/product.asp?sku=70000254, 1 pages., Aug. 29, 2003.

EBay: Company Overview, Retrieved from the Internet: <URL:http://web.archive.org/web/20040407121828/www.ebay.com/Homepage/com pany overview>,, 2004, 2 pages.

FAQ section of kaboodle.com, [Archived Aug. 13, 2006]. Retrieved from the Internet: <URL: http://web.archive.org/web/20060813110112/http://www.kaboodle.con/zd/help/faq.html>, Aug. 13, 2006, 7 pages.

Kabodle.com: Get Started with Kaboodle, [Archived Aug. 13, 2006]. Retrieved from the Internet: <URL: http://web.archive.org/web/20060813094114/www.kaboodle.com/zd/help/getStarted.html>, Aug. 13, 2006, 10 pages.

Kaboodle Delivers eBay's New "My Collectibles" Destination, [Online]. Retrieved from the Internet: <URI: http://www.kaboodle.com/zm/pr3>, Jun. 12, 2006, 2 pgs.

Zacharia et al., "Collaborative Reputation Mechanisms in Electronic Marketplaces", Proceedings of the 32nd Hawaii International Conference on System Sciences, 1999, pp. 1-7.

The archived step-by-step Guide to Using Kaboodle section of the Kaboodle website, Apr. 8, 2013.

Notice of Allowance received for Korean Patent Application No. 2010-7006376, dated May 30, 2012, 3 pages.

Office Action received for Korean Patent Application No. 10-2010-7006376 dated Oct. 14, 2011, 8 pages.

Final Office Action received for U.S. Appl. No. 11/963,399, dated Aug. 24, 2009, 23 pages.

Non-Final Office Action received for U.S. Appl. No. 11/963,399, dated Mar. 3, 2009, 16 pages.

Notice of Allowance received for U.S. Appl. No. 11/963,399, dated Jan. 6, 2010, 16 pages.

Final Office Action received for U.S. Appl. No. 11/963,426, dated May 13, 2010, 15 pages.

Non-Final Office Action received for U.S. Appl. No. 11/963,426, dated Aug. 27, 2009, 24 pages.

Non-Final Office Action received for U.S. Appl. No. 11/963,426, dated Mar. 3, 2009, 16 Pages.

Notice of Allowance received for U.S. Appl. No. 11/963,426, dated Nov. 15, 2010, 16 pages.

Supplemental Notice of Allowability received for U.S. Appl. No. 11/963,426, dated Apr. 22, 2011, 4 pages.

Non-Final Office Action received for U.S. Appl. No. 12/767,666, dated Dec. 8, 2010, 10 pages.

Notice of Allowance received for U.S. Appl. No. 12/767,666, dated Jun. 13, 2011, 14 pages.

Final Office Action received for U.S. Appl. No. 13/033,354, dated May 24, 2012, 17 pages.

Non-Final Office Action received for U.S. Appl. No. 13/033,354, dated Dec. 7, 2011, 13 pages.

Notice of Allowance received for U.S. Appl. No. 13/033,354, dated Dec. 11, 2012, 8 pages.

Supplemental Notice of Allowability received for U.S. Appl. No. 13/033,354, dated Jan. 15, 2013, 3 pages.

(56) References Cited

OTHER PUBLICATIONS

Final Office Action received for U.S. Appl. No. 13/177,336, dated Jun. 21, 2012, 12 pages.
Non-Final Office Action received for U.S. Appl. No. 13/177,336, dated Jan. 19, 2012, 13 pages.
Notice of Allowance received for U.S. Appl. No. 13/177,336, dated Oct. 3, 2012, 8 pages.
Final Office Action received for U.S. Appl. No. 13/177,341, dated May 18, 2012, 14 pages.
Non-Final Office Action received for U.S. Appl. No. 13/177,341, dated Jan. 12, 2012, 13 pages.
Notice of Allowance received for U.S. Appl. No. 13/177,341, dated Oct. 9, 2012, 13 pages.
Advisory Action received for U.S. Appl. No. 13/341,978, dated Sep. 22, 2017, 3 pages.
Advisory action received for U.S. Appl. No. 13/341,978 dated Feb. 19, 2016, 3 pages.
Final Office Action received for U.S. Appl. No. 13/341,978, dated Jun. 29, 2017, 17 pages.
Final Office Action received for U.S. Appl. No. 13/341,978, dated Jul. 24, 2015, 19 pages.
Non-Final Office Action received for U.S. Appl. No. 13/341,978, dated Dec. 29, 2014, 15 pages.
Non-Final Office Action received for U.S. Appl. No. 13/341,978, dated Feb. 8, 2017, 20 pages.
Non-Final Office Action received for U.S. Appl. No. 13/341,978, dated Jun. 30, 2014, 12 pages.
Final Office Action received for U.S. Appl. No. 13/783,583, dated Jun. 3, 2014, 12 pages.
Non-Final Office Action received for U.S. Appl. No. 13/783,583, dated Oct. 3, 2013, 12 pages.
Notice of Allowance received for U.S. Appl. No. 13/783,583, dated Jan. 22, 2015, 11 pages.
Non-Final Office Action received for U.S. Appl. No. 13/858,495, dated Jun. 25, 2013, 9 pages.
Non-Final Office Action received for U.S. Appl. No. 13/858,495, dated Oct. 10, 2014, 6 pages.
Notice of Allowance received for U.S. Appl. No. 13/858,495, dated Jan. 27, 2015, 5 pages.
Notice of Allowance received for U.S. Appl. No. 13/858,495, dated Mar. 20, 2014, 12 pages.
Ex Parte Quayle Action Received for U.S. Appl. No. 14/709,687, mailed on Mar. 21, 2019, 11 pages.
Final Office Action Received for U.S. Appl. No. 14/709,687, dated Feb. 4, 2020, 23 pages.
Non Final Office Action Received for U.S. Appl. No. 14/709,687 dated Jul. 22, 2020, 26 Pages.
Non-Final Office Action Received for U.S. Appl. No. 14/709,687, dated Aug. 19, 2019, 18 Pages.
Notice Of Allowance received for U.S. Appl. No. 14/709,687, dated Dec. 10, 2020, 9 Pages.
Supplemental Notice of Allowability Received for U.S. Appl. No. 16/534,605, dated Jul. 27, 2021, 8 Pages.
Notice of Allowance received for U.S. Appl. No. 14/709,687, dated May 20, 2019, 11 pages.
Restriction Requirement Received received for U.S. Appl. No. 14/709,687, dated Aug. 13, 2018, 6 pages.
Non-Final Office Action received for U.S. Appl. No. 14/720,814, dated May 19, 2017, 20 pages.
Notice of Allowance received for U.S. Appl. No. 14/720,814, dated Oct. 2, 2017, 7 pages.
Non-Final Office Action received for U.S. Appl. No. 15/865,894, dated Jul. 6, 2018, 13 pages.
Notice of Allowance received for U.S. Appl. No. 15/865,894, dated Feb. 7, 2019, 7 pages.
Notice of Allowance Received for U.S. Appl. No. 16/411,346, dated Feb. 26, 2021, 7 Pages.
Notice Of Allowance received for U.S. Appl. No. 16/411,346, dated Sep. 23, 2020, 13 pages.

Aho, Alfredv., "Data Structures and Algorithms: Chapter 3 Trees", Addison-Wesley Publishing Company, Menlo Park, California, 1983, 75-89.
Aho, A.V., "Directed Graphs", Date Structures And Algorithms, Chapter 6, Addison-Wesley Publishing Company, 1983, 198-219.
Alberto, "Reputation Managers are Happening", useit.core, Alertbox, Sep. 5, 1999, 4 pages.
Audioreview.com, "NAD 412 Reviews, Found on WayBackMachine", http://web.archive.org/web/19990203004345/www.audioreview.com/reviews/Turner/nad_412_turner.shtml, Accessed on Aug. 28, 2003, 9 pages.
Beyond.com,"IMS Web Spinner Personal V1.26 for Win95/98/NT", Virtual Machines, Retrieved from the Internet URL: http://web.archive.org/web/20000125152017/www.beyond.com/PKSN104373/prod.htmcrewiew, 2000, 3 pages.
Broida. Rick, "Secrets of Online Power Shopping:—Etailers offercool tools to help you shop better. smarter, and more often", Computer Shopper, v 21, e 11, downloaded from Dialog Web, Mar. 21, 2011, 7 pages.
Chandler, "Amazon.com expands into toys, electronics", Chicago Tribune, Jul. 14, 1999, 3 pages.
Consumer Review!, "49,000 Product Reviews by Consumers for Consumers", http://web.archive.org/web/19981206010249/http://www.consumerreview.com, 1996-1998, 22 pages.
Ebay, "The World's Online Marketplace", Retrieved from Internet URL: https://web-beta.archive.org/web/20070228151057/http://hub.ebay.com:80/buy, Feb.-Mar. 2007, 27 pages.
Epinions.com, "Epinions.com", http://web.archive.org/web/19991129024603/www.epinions.com/, 1999, 35 pages.
Festa, Paul, "Have an Epinion?", CNET News.com, Online Article, Jul. 9, 1999, 2 pages.
Guglielmo, Connie, "BizRate Lets Consumers Rate Sites", Interactive Week, 4(22), Aug. 4, 1997, 4 pages.
Halpern, Michelle, "In Your FACE", Marketing 112, 13, Jul. 16, 2007, pp. 45-47.
Kaboodle.com, "Internet Archive Wayback Machine", Retrieved from the Internet URL: <Internetwww.kaboddle.com>, Aug. 21, 2007, 10 pages.
Kornblum, Janet, Consumer Reports an online win, CNET News.com, Online Article, Nov. 2, 1998, 2 pages.
Krigel, Beth Lipton., "Big changes ahead for Deja News", CNET News.com, Online Article, Apr. 28, 1999, 3 pages.
Mason, Kerri, "Doing it for yourself: Dance Music Summit focuses on independence, selfreliance for artists, labels", BeatBox, Billboard, vol. 117, No. 42, Oct. 15, 2005, 2 pages.
Miller, Michael J. "The Best Products of 1999 Revealed", ZDNet, Dec. 13, 1999, 2 pages.
Newby, "Facebook, Politico to measure sentiment of GOP candidates by collecting posts", 2006-2012 Clarity Digital Group LLC d/b/a Examiner.com, Jun. 28, 2012, 3 pages.
Patience, Nick, "Epinions Launches Online Shopping Guide Built on Trust", Computergram International, n3744, Sep. 10, 1999, 2 pages.
International Preliminary Report on Patentability received for PCT Application No. PCT/US2008/010003, dated Mar. 4, 2010, 7 pages.
International Search Report received for PCT Application No. PCT/US2008/010003, dated Nov. 12, 2008, 4 page.
International Written Opinion received for PCT Application No. PCT/US2008/010003 dated Nov. 12, 2008, 4 pages.
International Preliminary Report on Patentability received for PCT Application No. PCT/US2008/010004, dated Mar. 4, 2010, 8 pages.
International Search Report received for PCT Application No. PCT/US2008/010004, dated Nov. 10, 2008, 5 page.
International Written Opinion received for PCT Application No. PCT/US2008/010004 dated Nov. 10, 2008, 5 pages.
Politicology, "Facebook Gives Politico Access Tto Your Political Beliefs", Ology, URL: http://www.ology.com/post/51413/facebook-gives-politico-access-to-your-political-beliefs, Accessed on Jun. 28, 2012, 4 pages.
PriceSCAN.com, "PriceSCAN: Your Unbiased Guide to the Lowest Prices on Books, Computers, Electronic . . . " http://web.archive.org/web/19991117123352/www.pricescan.com, 1997-99, 1 page.

(56) References Cited

OTHER PUBLICATIONS

Product ReviewNet!, "Welcome to Product ReviewNet! The Premier Online Source for Product Review Abstracts", http://web.archive.org/web/19981201205356/www.productreviewnet.com/splash.html, 1996-1998, 19 page.

Proquest, "Buy.com, Facebook team up to compete with eBay", The A.P., Charleston Daily Mail, Apr. 8, 2013, 1 page.

Sabater, Jordi, "Regret: A reputation model for gregarious societies", IIIA—Artificial Intelligence Research Intitute, CSIC—Spanish Scientific Research Council, Bellaterra, Catalonia, Spain, 1999, 9 pages.

Sifry, "Politico-Facebook Sentiment Analysis Will Generate "Bogus" Results, Expert Says", Retrieved from the Internet: <http://techpresident.com/news/21618/politico-facebook-sentiment-analysis-bogus>, Jan. 13, 2012, 4 pages.

Vendelo, Morten Thanning. , "Narrating Corporate Reputation: Becoming Legitimate Through Storytelling", International Studies of Management & Organization v28n3, Fall 1998, pp. 120-137.

Wolverton, Troy, "Productopia launches product review site", CNET News.com, Jul. 21, 1999, 2 pages.

U.S. Appl. No. 16/534,605, filed Aug. 7, 2019, Allowed.

U.S. Appl. No. 14/709,687, filed May 12, 2015, Patented.

U.S. Appl. No. 13/783,583, filed Mar. 4, 2013, Patented.

U.S. Appl. No. 13/177,341, filed Jul. 6, 2011, Patented.

U.S. Appl. No. 12/767,666, filed Apr. 26, 2010, Patented.

U.S. Appl. No. 11/963,399, filed Dec. 21, 2007, Patented.

Social Network, "Wikipedia, the free encyclopedia—Retrieved from the Internet URL: <https://en.wikipedia.org/wiki/Social_network", Nov. 7, 2005, pp. 1-7.

Non-Final Office Action received for U.S. Appl. No. 16/534,605, dated Oct. 1, 2020, 22 pages.

Notice of Allowance Received for U.S. Appl. No. 16/534,605, dated Mar. 31, 2021, 8 Pages.

Annen,"Social Capital, Inclusive Networks, and Economic Performance", Journal of Economic Behavior & Organization, vol. 50, Issue 4, Apr. 2003, 27 pages.

Churchill et al., "Anchored Conversations: Chatting in the Context of a Document", Proceedings of the SIGCHI conference on Human Factors in Computing Systems, Apr. 2000, 8 Pages.

Hanneman,"Introduction to Social Network Methods", On-line textbook, Riverside, CA: University of California, Riverside, Jan. 2005, 1-151 pp.

Heath et al., "Personalizing Relevance on the Semantic Web Through Trusted Recommendations From a Social Network", International Workshop on Semantic Web Personalization, 2006, 6 pages.

Jordan, "The Augmented Social Network: Building identity and trust into the next-generation Internet", First Monday, peer-previewed journal on the internet, vol. 8, No. 8, Aug. 4, 2003, 66 pages.

Jung,"Visualizing Recommendation Flow on Social Network", Journal of Universal Computer Science, vol. 11, No. 11 (2005), 2005, pp. 1780-1791.

Li et al., "Agent-based Buddy-finding Methodology for Knowledge Sharing", Information & Management 43 (2006), 2006, pp. 283-296.

Mui,"A Computational Model of Trust and Reputation", Proceedings of the 35th Hawaii International Conference on System Sciences—2002, 2002, 9 pages.

Neumann et al., "Semantic Social Network Portal for Collaborative Online Communities", Journal of European Industrial Training; 2005, vol. 29 Issue 6, 2005, pp. 472-487.

Nilakanta,"Controlling user authorization in relational database management systems", Information and Software Technology, vol. 31, Issue 6, Jul.-Aug. 1989, 290-294 pp.

Pujol,"Extracting Reputation in Multi Agent Systems by Means of Social Network Topology", Proceedings of the first international joint conference on Autonomous agents and multiagent systems, Jul. 15-19, 2002, 8 Pages.

Rasmusson et al., "Simulated Social Control for Secure Internet Commerce", Proceedings of the 1996 Workshop on New Security Paradigms, Sep. 17-20, 1996, pp. 18-25.

Sabater et al., "Reputation and Social Network Analysis in Multi-Agent Systems", Proceedings of the first international joint conference on Autonomous agents and multiagent systems: part 1 table of contents. Session: Session 2D: group and organizational dynamics, Jul. 15-19, 2002, 8 Pages.

Vivian et al..,"Social Networks in Transnational and Virtual Communities", Informing Science, InSITE—"Where Parallels Intersect", Jun. 2003, 1431-1437 pp.

Wellman,"An Electronic Group is Virtually a Social Network", almost final version of Chapter 9 in Sara Kiesler, ed., Culture of the Internet, Hillsdale, NJ: Lawrence Erlbaum, 1997, 26 pages.

Yu et al., "A Social Mechanism of Reputation Management in Electronic Communities", Proceedings of the 4th International Workshop on Cooperative Information Agents IV, The Future of Information Agents in Cyberspace, Jul. 7-9, 2000, 12 Pages.

Supplemental Notice of Allowability Received for U.S. Appl. No. 16/411,346, dated Jun. 23, 2021, 4 Pages.

U.S. Appl. No. 17/355,766 , "Final Office Action", U.S. Appl. No. 17/355,766, dated May 11, 2023, 9 pages.

U.S. Appl. No. 17/355,766 , "Non-Final Office Action", U.S. Appl. No. 17/355,766, dated Feb. 16, 2023, 8 pages.

U.S. Appl. No. 17/355,766 , "Non-Final Office Action", U.S. Appl. No. 17/355,766, dated Jul. 13, 2023, 9 pages.

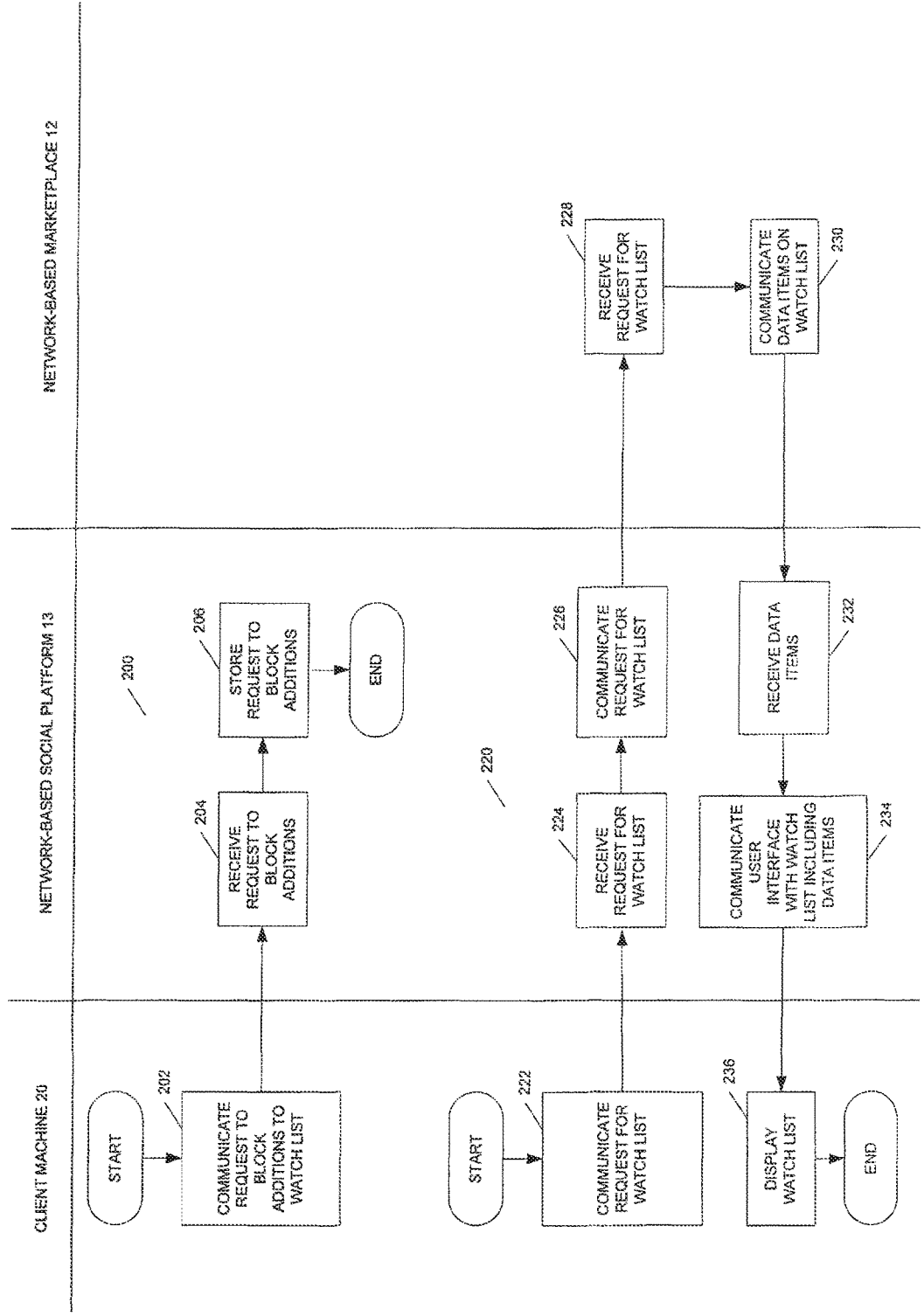

SOCIAL NETWORK PLATFORM

XYZ MARKETPLACE APPLICATION

JOHN DOE
XYZ MARKETPLACE MEMBER SINCE OCT-15-90

SEARCH RESULTS FOR IPHONES
123455 ITEMS FOUND FOR IPHONES

---

IPHONE 8GB, BRAND NEW, FACTORY BOX

CURRENT PRICE    $520.00
END TIME:        Aug-13-07 15:16:34 PDT
BIDS:            3

[WATCH IT]   [SHARE IT]   [VIEW IT ON XYZ MARKETPLACE]

---

IPHONE 8GB, USED

CURRENT PRICE    $300.00
END TIME:        Aug-13-07 15:16:34 PDT
BIDS:            0

[WATCH IT]   [SHARE IT]   [VIEW IT ON XYZ MARKETPLACE]

---

IPHONE 8GB, USED – EXCELLENT CONDITION

CURRENT PRICE    $320.00
END TIME:        Aug-13-07 15:16:34 PDT
BIDS:            5

[WATCH IT]   [SHARE IT]   [VIEW IT ON XYZ MARKETPLACE]

*FIG. 11*

SHARING INFORMATION ON A NETWORK-BASED SOCIAL PLATFORM

RELATED APPLICATIONS

This application is a continuation application of U.S. patent application Ser. No. 16/534,605, filed Aug. 7, 2019, which is a continuation of U.S. patent application Ser. No. 14/709,687, filed May 12, 2015, issued as U.S. Pat. No. 10,984,126, which is a continuation of U.S. patent application Ser. No. 13/783,583, filed Mar. 4, 2013, issued as U.S. Pat. No. 9,037,503, entitled "Sharing Information on a Network-Based Social Platform," which is a continuation of U.S. patent application Ser. No. 13/177,341, filed Jul. 6, 2011, entitled "Sharing Information on a Network-Based Social Platform,", now U.S. Pat. No. 8,392,271, which is a continuation of U.S. patent application Ser. No. 12/767,666, filed Apr. 26, 2010 entitled "Sharing Information on a Network-Based Social Platform,", now U.S. Pat. No. 8,001,010, which is a continuation of U.S. patent application Ser. No. 11/963,399, filed Dec. 21, 2007, now U.S. Pat. No. 7,720,722, which claims the priority benefit of U.S. Provisional Application No. 60/957,645, filed Aug. 23, 2007, all of which are incorporated herein by reference.

FIELD

Embodiments relate generally to the technical field of data communications and, in one example embodiment, to communications over a network.

BACKGROUND

Applications available on the Internet have progressed from facilitating a medium of information delivery to a venue for sales and more recently to a platform for social networking. Online market places such as Amazon.com and eBay.com are examples of online sellers. Similarly, mySpace.com and Facebook.com are examples of social networking.

BRIEF DESCRIPTION OF DRAWINGS

The present disclosure is illustrated by way of example and not limitation in the figures of the accompanying drawings, in which like references indicate similar elements and in which:

FIG. 9 is a block diagram illustrating a method, according to an embodiment, to block the addition of an item to a list;

FIG. 10 is a block diagram illustrating a method, according to an embodiment, to display a list;

FIGS. 11-15 are diagrams illustrating user interfaces, according to an embodiment.

DETAILED DESCRIPTION

In the following description, for purposes of explanation, numerous specific details are set forth in order to provide a thorough understanding of an embodiment of the present disclosure. It will be evident, however, to one skilled in the art that the present disclosure may be practiced without these specific details.

In some example embodiments, a system and method for sharing information on a network-based social platform is illustrated. A request may be received from a first user of a network-based social platform to add an item to a list associated with a second user of the network-based social platform. For example, the item may be for sale on a network-based marketplace. The list may include one or more items and facilitate watching the items in real time (e.g., watch list) on the network-based social platform to monitor the progress of an auction or an immediate purchase of the item on the network-based marketplace. Next, in some embodiments, the system may determine whether the first user is authorized to add the item to the list based on a predetermined relationship between the first user and the second user. For example, a predetermined relationship may have been consensually established by the first and second users on the network-based social platform and may, in some embodiments, include the relationship "friend" or "favorite friend." Finally, the system may communicate the request to the network-based marketplace which, in turn, adds the item to the list associated with the second user. Accordingly, in some embodiments, a first user on a network-based social platform may share information concerning an item available on a network-based marketplace with a second user on a network-based social platform by adding the item to a list used to monitor the item on the network-based social platform. In some embodiments, the second user may block the first user from adding the item to the watch list of the second user.

Platform Architecture

Figure 1:
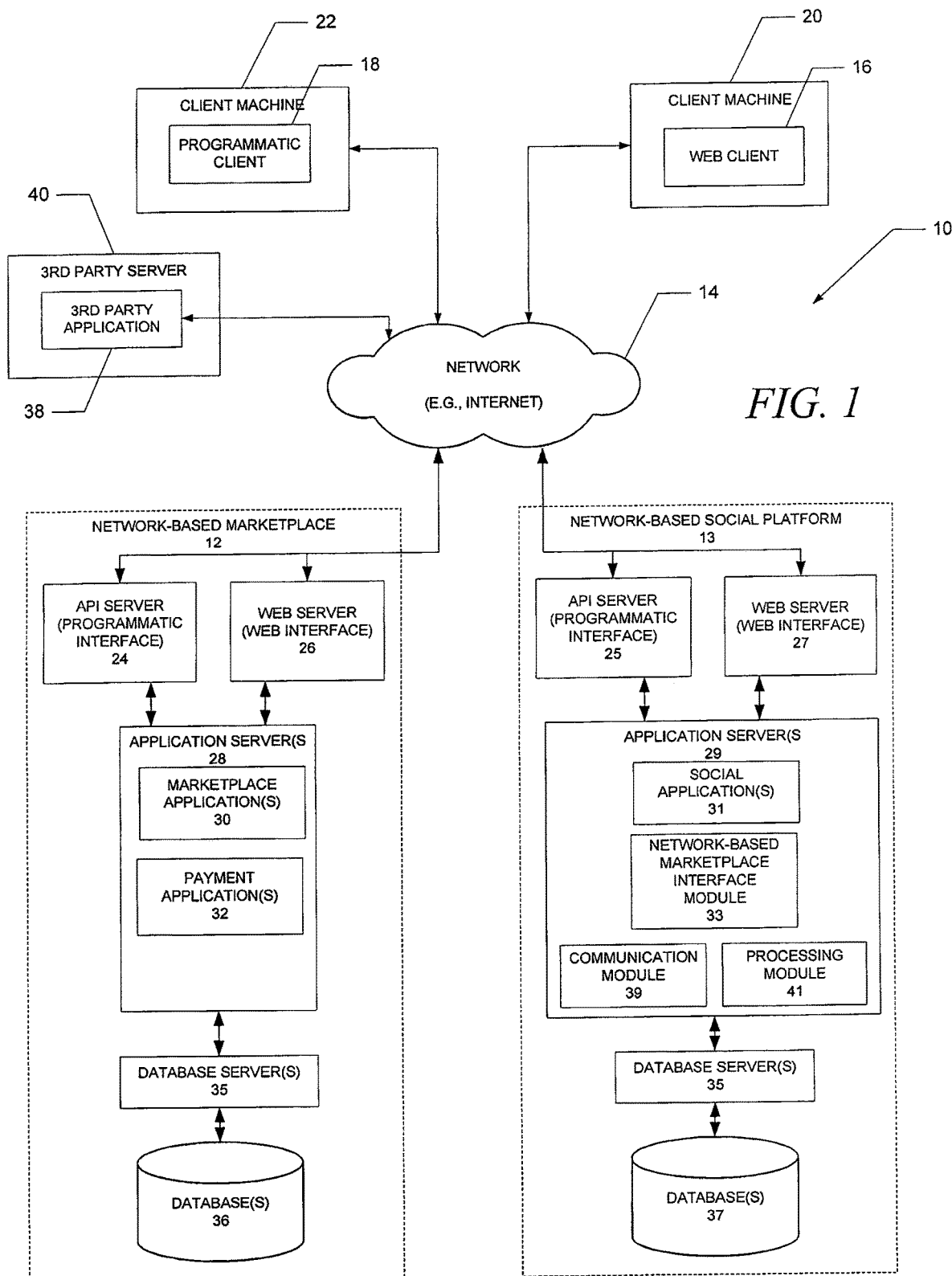
FIG. 1 is a network diagram depicting a system, according to one example embodiment, having a client-server architecture.

FIG. 1 is a network diagram depicting a system 10, according to one embodiment of the present disclosure, having a client-server and a peer-to peer architecture. The system 10 facilitates shopping activity, in the exemplary form of a network-based marketplace 12, and a network-based social platform 13 that communicate over a network 14. In one embodiment, the network-based marketplace 12 and the network-based social platform 13 communicate in peer-to peer architecture via programmatic interfaces. Further, the network-based marketplace 12 and the network-based social platform 13 respectively communicate in client-server architecture with clients. The network-based marketplace 12, provides server-side functionality, via the network 14 (e.g., the Internet), to the one or more client machines 20 and 22. Similarly, the network-based social platform 13 provides server-side functionality, via the network 14 (e.g., the Internet), to the one or more client machines 20 and 22. FIG. 1 illustrates, for example, a web client 16 (e.g., a browser, such as the Internet Explorer browser developed by Microsoft Corporation of Redmond, Washington State), and a programmatic client 18 executing on respective client machines 20 and 22.

Turning specifically to the network-based social platform 13, an application program interface (API) server 25 and a web server 27 are coupled to, and provide programmatic and web interfaces respectively to, one or more application servers 29. The application servers 29 may host one or more social applications 31 and a network-based marketplace interface module 33 that communicates with a communication module 39 and a processing module 41. The application servers 28 are, in turn, shown to be coupled to one or more databases servers 35 that facilitate access to one or more databases 37.

The social applications 31 provide a number of social networking functions and services to users that access the network-based social platform 13. For example, the social applications 31 may enable a user to store information in a profile that may be viewed at the client machines 20, 22 and to selectively grant access to information that appears on the profile to other users who may also view the profile at their client machines 20, 22. The social applications 31 may provide criteria that may be employed by a user to grant various levels of access to various levels of users. For example, a first user may access profile information associated with a second user responsive to the first user achieving the status of "friend" in relation to a second user. A user may achieve the status of friend by accepting an invitation from another user or by sending a request to a user that subsequently grants the request.

The social applications 31 may further enable third party service providers to add "applications" on the network-based social platform 13 that are utilized by users to interact with other users. For example, a network-based marketplace application may be added by a third party service provider in the form of the network-based marketplace interface module 33, the communication module 39, and the processing module 41 that may provide market application services in the network-based social platform 13 environment and may communicate with the network-based marketplace 12.

In one embodiment, a request related to the marketplace application may be generally processed as follows. The request may originate at the client machines 20, 22 that communicates the request via programmatic or web interface services 25, 27 to the social applications 31 that, in turn, communicate the request to the network-based marketplace interface module 33 that, in turn, communicates the request to the communication module 39 and processing module 41 that process the request. Conversely, the communication module 39 and processing module 41 may respond to the social applications 31 via the network-based marketplace interface module 33. In some instances processing of the request may require communication with the network-based marketplace 12. In such instances the communication module 41 or the processing module 41 may communicate via the API interface 25 with the network-based marketplace 12.

The network-based social platform 13 may be embodied as FACEBOOK® services, a social utility that connects people with friends and others who work, study and live around them provided by Facebook of Palo Alto, California.

The web client 16, it will be appreciated, accesses the various social applications 31 via the web interface supported by the web server 27. Similarly, the programmatic client 18 accesses the various services and functions provided by the social applications 31 via the programmatic interface provided by the API server 25.

Turning to the network-based marketplace 12, an application program interface (API) server 24 and a web server 26 are coupled to, and provide programmatic and web interfaces respectively to, one or more application servers 28. The application servers 28 host one or more marketplace applications 30 and payment applications 32. The application servers 28 are, in turn, shown to be coupled to one or more databases servers 35 that facilitate access to one or more databases 36.

The marketplace applications 30 provide a number of marketplace functions and services to users that access the marketplace 12. The payment applications 32 likewise provide a number of payment services and functions to users. The payment applications 32 may allow users to quantify for, and accumulate, value (e.g., in a commercial currency, such as the U.S. dollar, or a proprietary currency, such as "points") in accounts, and then later to redeem the accumulated value for products (e.g., goods or services) that are made available via the marketplace applications 30. While the marketplace and payment applications 30 and 32 are shown in FIG. 1 to both form part of the network-based marketplace 12, it will be appreciated that, in alternative embodiments of the present disclosure, the payment applications 32 may form part of a payment service that is separate and distinct from the marketplace 12. The network-based marketplace 12 may be embodied as eBAY, the world's online marketplace, provided by eBay of San Jose, California.

Further, while the system 10 shown in FIG. 1 employs a client-server architecture and a peer-to-peer architecture, the present disclosure is of course not limited to such an architecture, and could equally well find application in any combination of client-server, distributed, or peer-to-peer, architecture systems. The various marketplace and payment applications 30 and 32 could also be implemented as stand-alone software programs, which do not necessarily have networking capabilities.

The web client 16, it will be appreciated, accesses the various marketplace and payment applications 30 and 32 via the web interface supported by the web server 26. Similarly, the programmatic client 18 accesses the various services and functions provided by the marketplace and payment applications 30 and 32 via the programmatic interface provided by the API server 24. The programmatic client 18 may, for example, be a seller application (e.g., the TurboLister application developed by eBay Inc., of San Jose, California) to enable sellers to author and manage listings of items on the marketplace 12 in an off-line manner, and to perform batch-mode communications between the programmatic client 18 and the network-based marketplace 12.

It will be appreciated that the marketplace applications 30, payment applications 32, social applications 31, the network-based marketplace interface module 33, the communication module 39 and the processing module 41 may execute on a single platform. Accordingly, in one embodiment, the aforementioned applications/modules may execute on the network-based marketplace 12 and in another embodiment the aforementioned applications/module may execute on the network-based social platform 13.

FIG. 1 also illustrates a third party application 38, executing on a third party server machine 40, as having programmatic access to the network-based marketplace 12 via the programmatic interface provided by the API server 24. For example, the third party application 38 may, utilizing information retrieved from the network-based marketplace 12, support one or more features or functions on a website hosted by the third party. The third party website may, for example, provide one or more promotional, marketplace or payment functions that are supported by the relevant applications of the network-based marketplace 12.

Social Platform Applications

Figure 2:
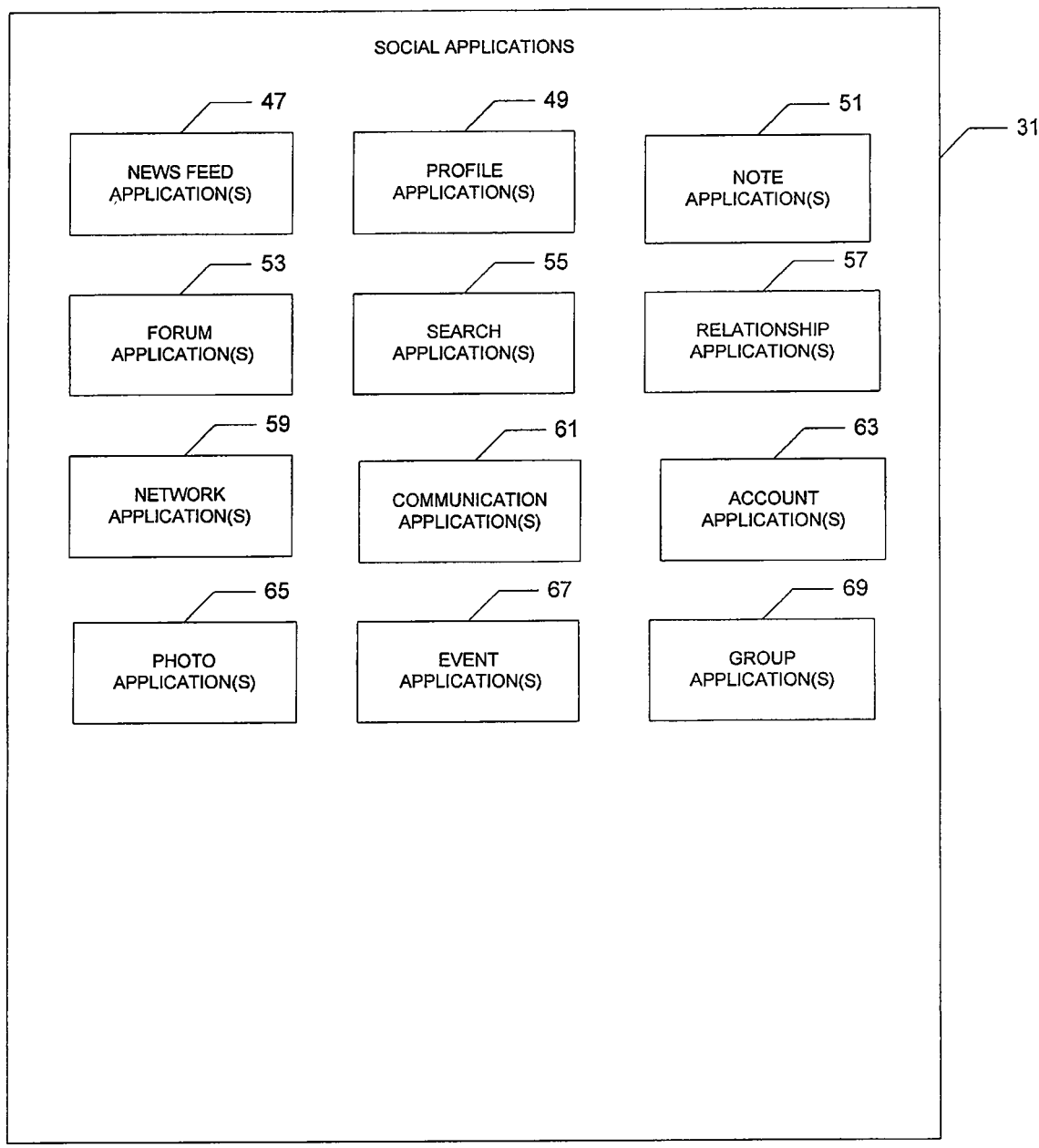
FIG. 2 is a block diagram illustrating social applications, according to an embodiment.

FIG. 2 is a block diagram illustrating applications that execute on the network-based social platform, according to an embodiment. The network-based social platform applications include news feed applications 47, profile applications 49, note applications 51, forum applications 53, search applications 55, relationship applications 57, network applications 59, communication applications 61, account applications 63, photo applications 65, event applications 67, and group applications 69.

The news feed applications 47 publish events associated with the user and friends of the user on the network-based social platform 13. The news feed applications 47 may publish the events on the user profile of a user. For example, the news feed applications 47 may publish the uploading of a photo album by one user on the user profile the user and the user profiles of friends of the user.

The profile applications 49 may maintain user profiles for each of the users on the network-based social platform 13. Further, the profile applications 49 may enable a user to restrict access to selected parts of their profile to prevent viewing by other users. The notes applications 51 may be used to author notes that may be published on various user interfaces.

The forum applications 53 may maintain a forum for users to post comments and display the forum via the profile associated with a user. The user may add comments to the forum, remove comments from the forum and restrict visibility to other users. In addition, other users may post comments to the forum. The search applications 55 may enable a user to perform a keyword search for users, groups, and events. In addition, the search applications 55 may enable a user to search for content (e.g. favorite movies) on profiles accessible to the user.

The relationship applications 57 may maintain relationship information for the users. The network applications 59 may facilitate the addition of social networks by a user, the social networks based on a school, workplace, or region or any social construct for which the user may prove an affiliation. The communication applications 61 may process incoming and outgoing messages, maintain an inbox for each user, facilitate sharing of content, facilitate interaction among friends (e.g., poking), process requests, process events, process group invitations and process communicating notifications.

The account applications 63 may provide services to facilitate registering, updating, and deleting user accounts. The photo applications 65 may provide services to upload photographs, arrange photographs, set privacy options for albums and tag photographs with text strings. The event applications 67 provide services to create events, review upcoming events, and review past events. The group applications 69 may be used to maintain group information, display group information, and navigate to groups.

Figure 3:
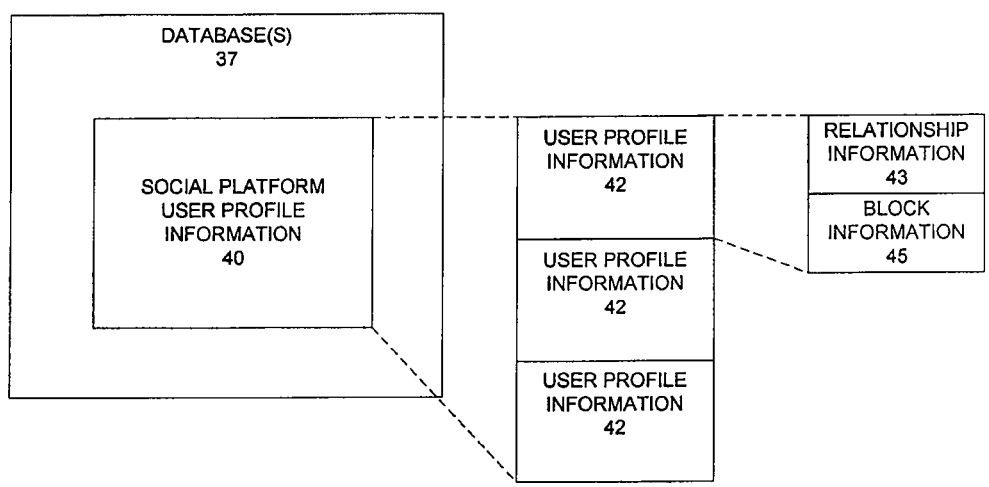
FIG. 3 is a block diagram illustrating a database, according to an embodiment.

FIG. 3 is a block diagram illustrating a database 37, according to an embodiment, at a network-based social platform 13. The database 37 is shown to include social platform user profile information 42 that stores user profile information for each user on the network-based social platform 13. The user profile information 42 may include information related to the user and specifically may include relationship information 43 and block information 45. The relationship information 43 may store a predetermined relationship between the user associated with the user profile information 42 and other users on the network-based social platform 13. For example, a first user, may be designated a "friend," or "favourite friend," etc. with a second user, the first user associated with the user profile information 42 and the respective designations associated with increasing levels of disclosure between the first user and second user. The block information 45 may store a configured preference of the user to block the addition of an item by other users to the watch list associated with the user.

Marketplace and Payment Applications

Figure 4:
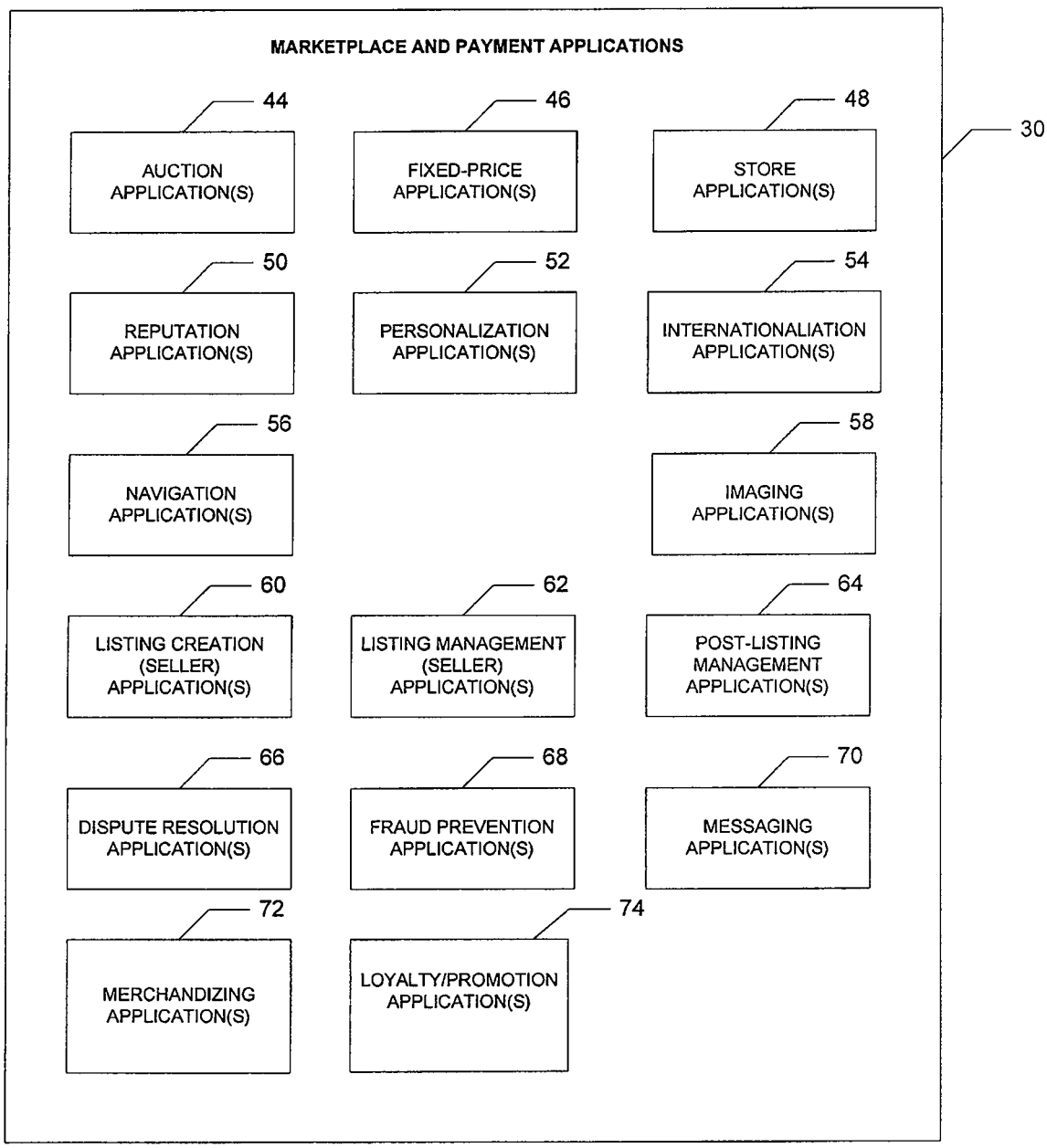
FIG. 4 is a block diagram illustrating marketplace and payment applications, according to an embodiment.

FIG. 4 is a block diagram illustrating multiple marketplace and payment applications 30, 32 that, in one exemplary embodiment of the present disclosure, are provided as part of the network-based marketplace 12. The marketplace 12 may provide a number of listing and price-setting mechanisms whereby a seller may list goods or services for sale, a buyer can express interest in or indicate a desire to purchase such goods or services, and a price can be set for a transaction pertaining to the goods or services. To this end, the marketplace applications 30 are shown to include one or more auction applications 44 which support auction-format listing and price setting mechanisms (e.g., English, Dutch, Vickrey, Chinese, Double, Reverse auctions etc.). The various auction applications 44 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 46 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, California) may be offered in conjunction with an auction-format listing, and allow a buyer to purchase goods or services, which are also being offered for sale via an auction, for a fixed-price that is typically higher than the starting price of the auction.

Store applications 48 allow sellers to group their listings within a "virtual" store, which may be branded and otherwise personalized by and for the sellers. Such a virtual store may also offer promotions, incentives and features that are specific and personalized to a relevant seller.

Reputation applications 50 allow parties that transact utilizing the network-based marketplace 12 to establish, build, and maintain reputations, which may be made available and published to potential trading partners. Consider that where, for example, the network-based marketplace 12 supports person-to-person trading, users may have no history or other reference information whereby the trustworthiness and credibility of potential trading partners may be assessed. The reputation applications 50 allow a user, for example through feedback provided by other transaction partners, to establish a reputation within the network-based marketplace 12 over time. Other potential trading partners may then reference such a reputation for the purposes of assessing credibility and trustworthiness.

Personalization applications 52 allow users of the marketplace 12 to personalize various aspects of their interactions with the marketplace 12. For example a user may, utilizing an appropriate personalization application 52, create a personalized reference page at which information regarding transactions to which the user is (or has been) a party may be viewed. Further, a personalization application 52 may enable a user to personalize listings and other aspects of their interactions with the marketplace 12 and other parties.

In one embodiment, the network-based marketplace 12 may support a number of marketplaces that are customized, for example, for specific geographic regions. A version of the marketplace 12 may be customized for the United Kingdom, whereas another version of the marketplace 12 may be customized for the United States. Each of these versions may operate as an independent marketplace, or may be customized (or internationalized) presentations of a common underlying marketplace by internationalization application 54.

Navigation of the network-based marketplace 12 may be facilitated by one or more navigation applications 56. For example, a search application enables key word searches of listings published via the marketplace 12. A browse application allows users to browse various category, catalogue, or inventory data structures according to which listings may be classified within the marketplace 12. Various other navigation applications may be provided to supplement the search and browsing applications.

In order to make listings, available via the network-based marketplace 12, as visually informing and attractive as possible, the marketplace applications 30 may include one or more imaging applications 58 utilizing which users may upload images for inclusion within listings. An imaging application 58 also operates to incorporate images within viewed listings. The imaging applications 58 may also support one or more promotional features, such as image galleries that are presented to potential buyers. For example, sellers may pay an additional fee to have an image included within a gallery of images for promoted items.

Listing creation applications 60 allow sellers conveniently to author listings pertaining to goods or services that they wish to transact via the marketplace 12, and listing management applications 62 to allow sellers to manage such listings. Specifically, where a particular seller has authored and/or published a large number of listings, the management of such listings may present a challenge. The listing management applications 62 provide a number of features (e.g., auto-relisting, inventory level monitors, etc.) to assist the seller in managing such listings. One or more post-listing management applications 64 also assist sellers with a number of activities that typically occur post-listing. For example, upon completion of an auction facilitated by one or more auction applications 44, a seller may wish to leave feedback regarding a particular buyer. To this end, a post-listing management application 64 may provide an interface to one or more reputation applications 50, so as to allow the seller conveniently to provide feedback regarding multiple buyers to the reputation applications 50. In addition, the post listing management applications 64 may facilitate tracking and organization of listings for a user by maintaining identified listings in lists. For example, the lists may include watch information in the form of identified items that are offered for sale on the network-based marketplace 12.

Dispute resolution applications 66 provide mechanisms whereby disputes arising between transacting parties may be resolved. For example, the dispute resolution applications 66 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 68 implement various fraud detection and prevention mechanisms to reduce the occurrence of fraud within the marketplace 12.

Messaging applications 70 are responsible for the generation and delivery of messages to users of the network-based marketplace 12, such messages for example advising users regarding the status of listings at the marketplace 12 (e.g., providing "outbid" notices to bidders during an auction process or to provide promotional and merchandising information to users).

Merchandising applications 72 support various merchandising functions that are made available to sellers to enable sellers to increase sales via the marketplace 12. The merchandising applications 80 also operate the various merchandising features that may be invoked by sellers, and may monitor and track the success of merchandising strategies employed by sellers.

The network-based marketplace 12 itself, or one or more parties that transact via the marketplace 12, may operate loyalty programs that are supported by one or more loyalty/promotions applications 74. For example, a buyer may earn loyalty or promotions points for each transaction established and/or concluded with a particular seller, and be offered a reward for which accumulated loyalty points can be redeemed.

Data Structures

Figure 5:
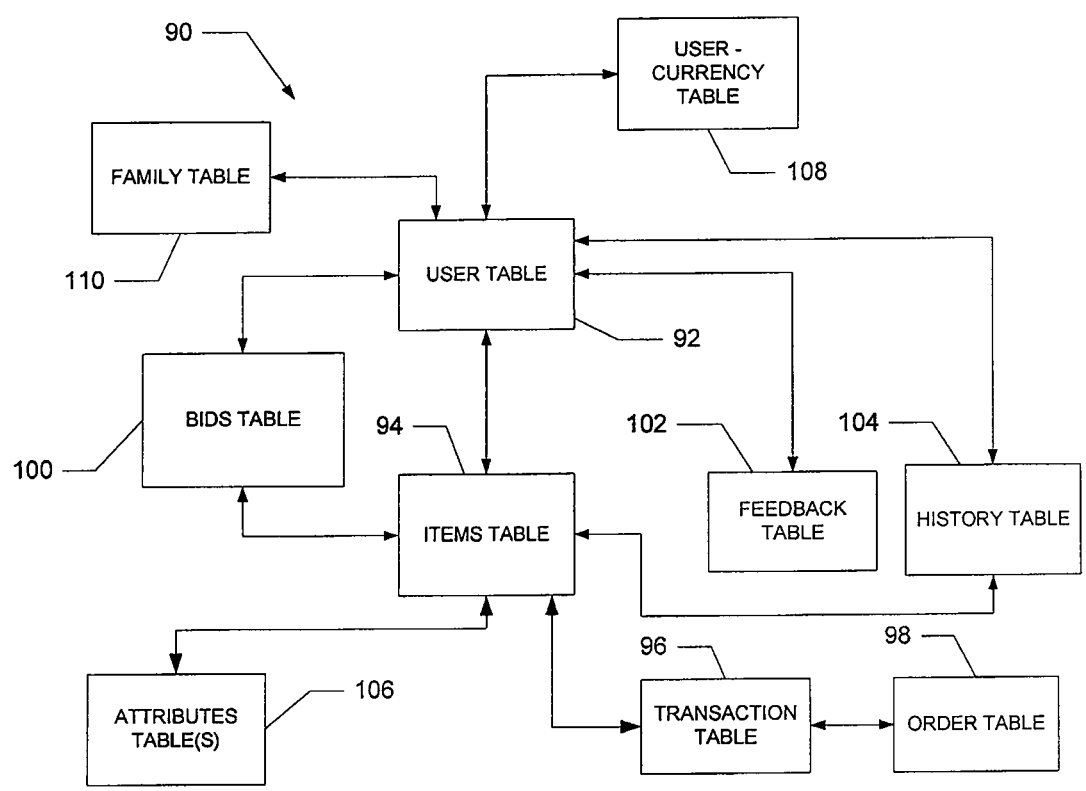
FIG. 5 is a high-level entity-relationship diagram, illustrating various tables stored on a database(s)

FIG. 5 is a high-level entity-relationship diagram, illustrating various tables 90 that may be maintained within the databases 36, and that are utilized by and support the marketplace and payment applications 30 and 32. A user table 92 contains a record for each registered user of the network-based marketplace 12, and may include identifier, address and financial instrument information pertaining to each such registered user. A user may, it will be appreciated, operate as a seller, a buyer, or both, within the network-based marketplace 12. In one exemplary embodiment of the present disclosure, a buyer may be a user that has accumulated value (e.g., commercial or proprietary currency), and is then able to exchange the accumulated value for items that are offered for sale by the network-based marketplace 12.

The tables 90 also include an items table 94 in which are maintained item records (e.g., item information) for goods and services that are available to be, or have been, transacted via the marketplace 12. Each item record within the items table 94 may furthermore be linked to one or more user records within the user table 92, so as to associate a seller and one or more actual or potential buyers with each item record.

A transaction table 96 contains a record for each transaction (e.g., a purchase transaction) pertaining to items for which records exist within the items table 94. An order table 98 is populated with order records, each order record being associated with an order. Each order, in turn, may be with respect to one or more transactions for which records exist within the transactions table 96.

Bid records within a bids table 100 each relate to a bid received at the network-based marketplace 12 in connection with an auction-format listing supported by an auction application 44. A feedback table 102 is utilized by one or more reputation applications 50, in one exemplary embodiment, to construct and maintain reputation information concerning users. In one embodiment, the reputation information may include feedback records associated with transactions. A history table 104 maintains a history of transactions to which a user has been a party. One or more attributes tables 106 record attribute information pertaining to items for which records exist within the items table 94. Considering only a single example of such an attribute, the attributes tables 106 may indicate a currency attribute associated with a particular item, the currency attribute identifying the currency of a price for the relevant item as specified in by a seller.

Figure 6:
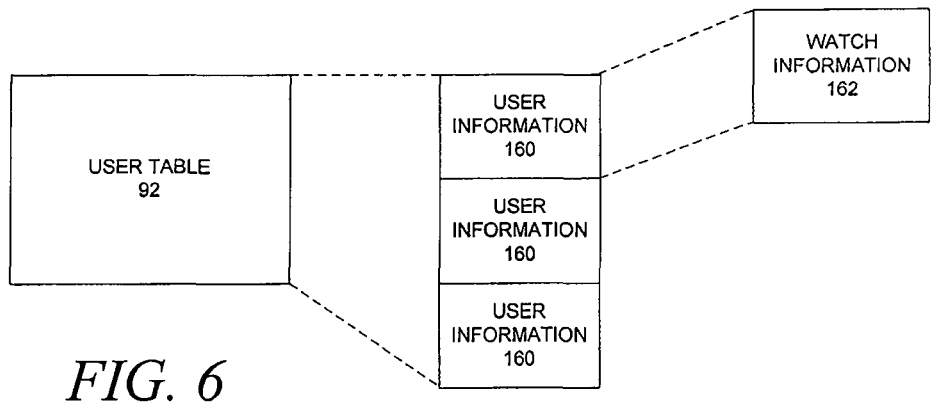
FIG. 6 is a block diagram illustrating a user table, according to an embodiment.

FIG. 6 is a block diagram illustrating a user table 92, according to an embodiment. The user table 92 includes a user information entry 160 for each user on the network-based marketplace 12. Each user information entry 160 may specifically include watch information 162. The watch information 162 includes item identifiers that correspond to items for sale on the network-based marketplace 12 (e.g., watch list). For example, the user may be interested in a listing for a book that is currently being auctioned. To monitor the sale of the book the user may add the book to the watch list associated with the user. In addition, the user may add the item to the watch list of another user.

Figure 7:
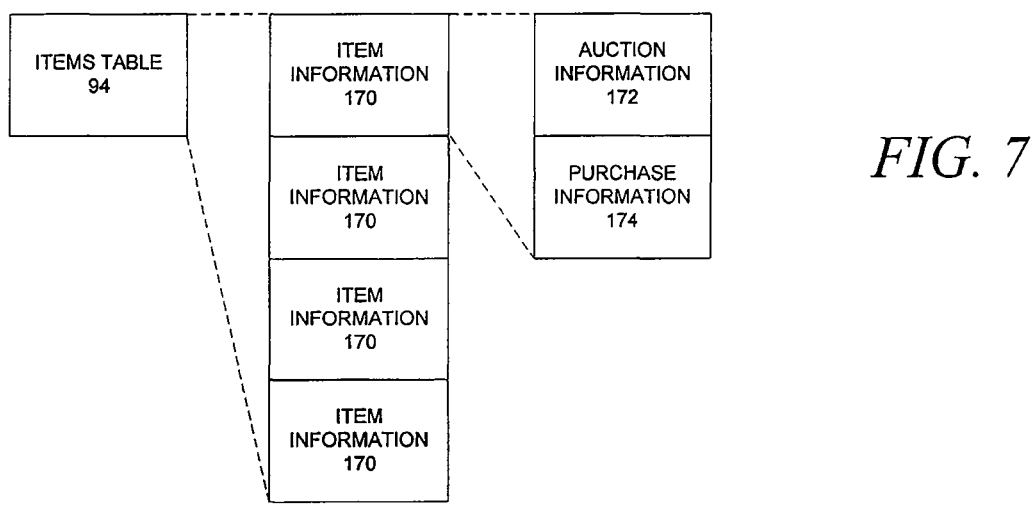
FIG. 7 is a block diagram illustrating an items table, according to an embodiment.

FIG. 7 is a block diagram illustrating an items table 94, according to an embodiment. The items table 94 includes item information 170 for each item on the network-based marketplace 12. For example, the item information 170 may store a title, a description, a photograph, or any other information or content descriptive of goods or services that may be offered for sale on the network-based marketplace 12. The item information 170 is specifically shown to include auction information 172 and purchase information 174. The auction information 172 may include information related to the auctioning of the item (e g, minimum bid, current bid, highest bid, start time of auction, end time of auction, etc.). The purchase information 174 may include information related to the purchase of the item (e.g., purchase price). In one embodiment, an item offered for sale on the network-based marketplace 12 may be acquired by submitting the highest bid in an auction or by paying a predetermined purchase price.

Figure 8:
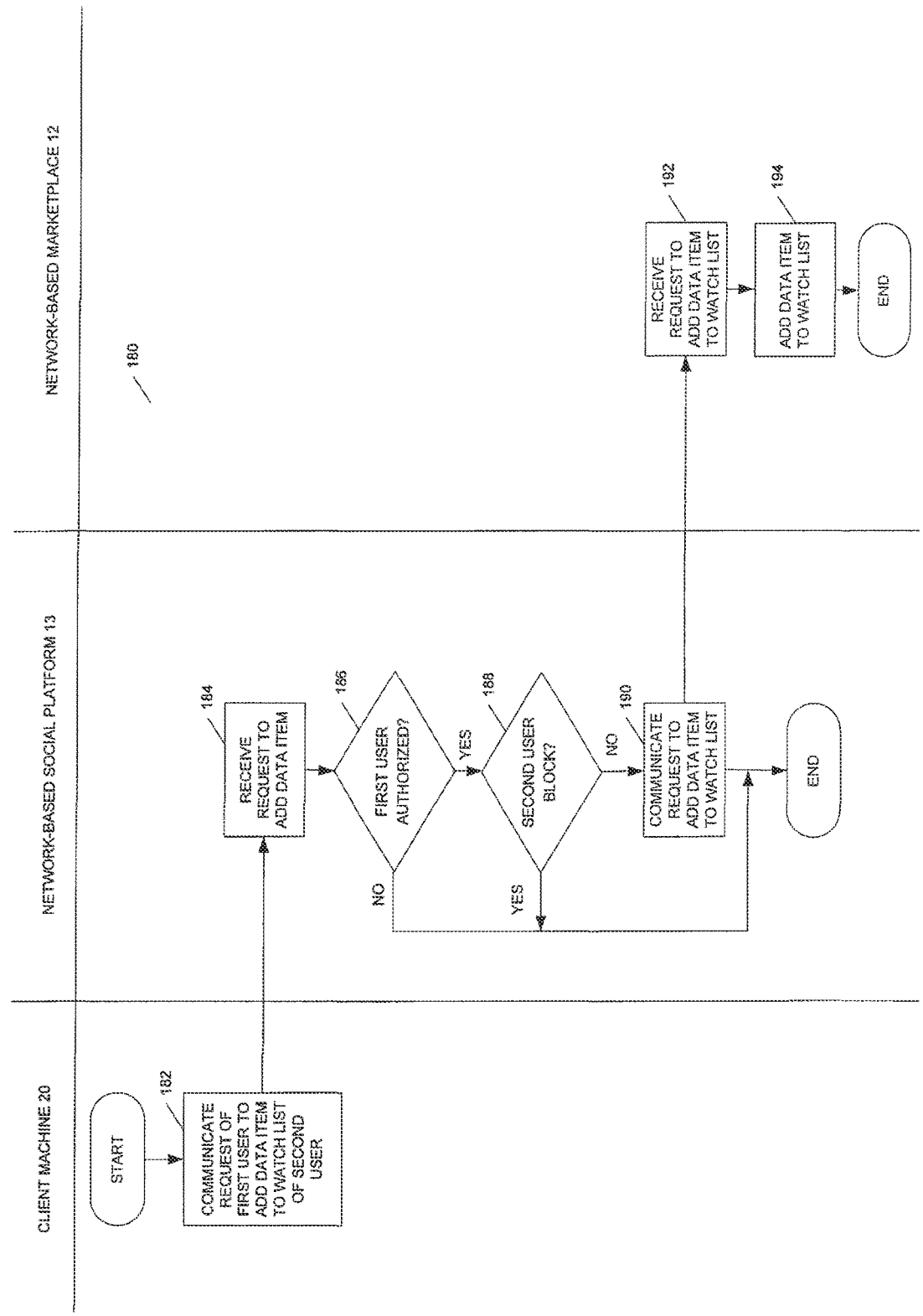
FIG. 8 is a block diagram illustrating a method, according to an embodiment, to add an item to a list.

FIG. 8 is a block diagram illustrating a method 180, according to an embodiment, to add an item for sale on a network-based marketplace to a list of another user on a network-based social platform. Illustrated on the right is the network-based marketplace 12. Illustrated in the middle is the network-based social platform 13 and illustrated on the left is the client machine 20.

A first user may have searched for iPhones offered for sale on the network-based marketplace 12 by using a search facility provided by the marketplace application on the network-based social platform 13. After identifying an iPhone of particular interest in the search results, the method 180 may commence, at operation 182, with the first user requesting the iPhone (e.g., item) be added to the watch list of a second user on the network-based social platform 13. At operation 184, at the network-based social platform 13, the request may be received by the social applications 31 that forward the request to the network-based marketplace interface module 33 that forwards the request to the communication module 39.

At decision operation 186, the processing module 41 may determine whether the user is authorized to add the item to the list associated with the second user. For example, the processing module 41 may determine whether relationship information 43 for the first user identifies a predetermined relationship with the second user as being a "friend" or a "favourite friend." If the second user is determined to be a "friend" or a "favourite friend" then a branch is made to decision operation 188. Otherwise processing ends.

At decision operation 188, the processing module 41 determines whether the second user has blocked the addition of items to the list (e.g., watch list) associated with the second user. For example, the processing module 41 may determine whether block information 45 associated with the second user prohibits addition of items to the list of the second user. If the block information 45 blocks additions to the list then processing ends. Otherwise processing continues at operation 190. At operation 190, the communication module 39 communicates the request to add the iPhone to the network-based marketplace 12.

At operation 192, the network-based marketplace 12 receives the request to add the iPhone and at operation 194 the network-based marketplace 12 adds the corresponding item identifier to the watch list associated with the second user. For example, the network-based marketplace 12 may store the item identifier in the watch information 162 associated with the second user.

FIG. 9 is a block diagram illustrating a method 200, according to an embodiment, to block the addition of an item to a list. Illustrated on the right is the network-based marketplace 12. Illustrated in the middle is the network-based social platform 13 and illustrated on the left is the client machine 20. The method 200 commences at operation 202 with the user at the client machine 20 requesting that additions of items to the watch list associated with the user be blocked.

At operation 204, at the network-based social platform 13, the request is received by the social applications 31 that forward the request to the network-based marketplace interface module 33 that forwards the request to the communication module 39. At operation 206 the processing module stores the request to block additions for the user and processing ends. For example, the processing module 41 may store the request in the block information 45 associated with the user. In another embodiment, the block information 45 may be stored as user information 160 at the network-based marketplace 12.

FIG. 10 is a block diagram illustrating a method 220, according to an embodiment, to display a list. Illustrated on the right is the network-based marketplace 12. Illustrated in the middle is the network-based social platform 13 and illustrated on the left is the client machine 20. The method 220 commences at operation 222 with the user at the client machine 20 requesting their watch list to be displayed.

At operation 224, at the network-based social platform 13, the request is received by the social applications 31 that forward the request to the network-based marketplace interface module 33 that forwards the request to the communication module 39 and at operation 226, the communication module 39 forwards the request to the network-based marketplace 12.

At operation 228, the network-based marketplace 12 receives the request and at operation 230 the network-based marketplace 12 communicates the requested items to the network-based social platform 13. For example, the network-based marketplace 12 may retrieve the item identifiers from the watch information 162 associated with the requesting user.

At operation 232, the communication module 39, at the network-based social platform 13, receives the item identifiers and at operation 234 the communication module 39 may communicate a user interface that includes the items (e.g., watch list) to the social applications 31 that, in turn, communicate the user interface that includes the requested items (e.g., watch list), via the web interface 27, to the client machine 20 where it is displayed at operation 236.

FIG. 11 is a diagram illustrating a user interface 250, according to an embodiment. The user interface 250 displays search results that were generated in response to a user entering a search request (e.g., keyword) received by the network-based social platform 13. The user interface 250 includes user interface elements 252 that relate a description of the user that requested the search, the keywords entered by the user (e.g., iPhones), and a count of search results. For example, "John Doe" requested a search for "iPhones" and received search results including 123455 items. Further, the user interface 250 includes search results 254 in the form of user interface elements 256 that respectively correspond to items. Each user interface element 256 includes a user interface elements 258, 260, and 262. The user interface element 258 may be selected to add the corresponding item to the watch list associated with the user that requested the search results (e.g., John Doe). The user interface element 260 may be selected to add the item to the watch list of one or more user, as illustrated on FIG. 12. The user interface element 262 may be selected to view the item on a user interface that is served by the network-based marketplace 12. The user interface served by the network-based marketplace 12 may for example include item information 170 describing the item, auction information 112 that enables the user to enter a bid in an auction of the item, and purchase information 174 that enables the user to purchase the item.

Figure 12:
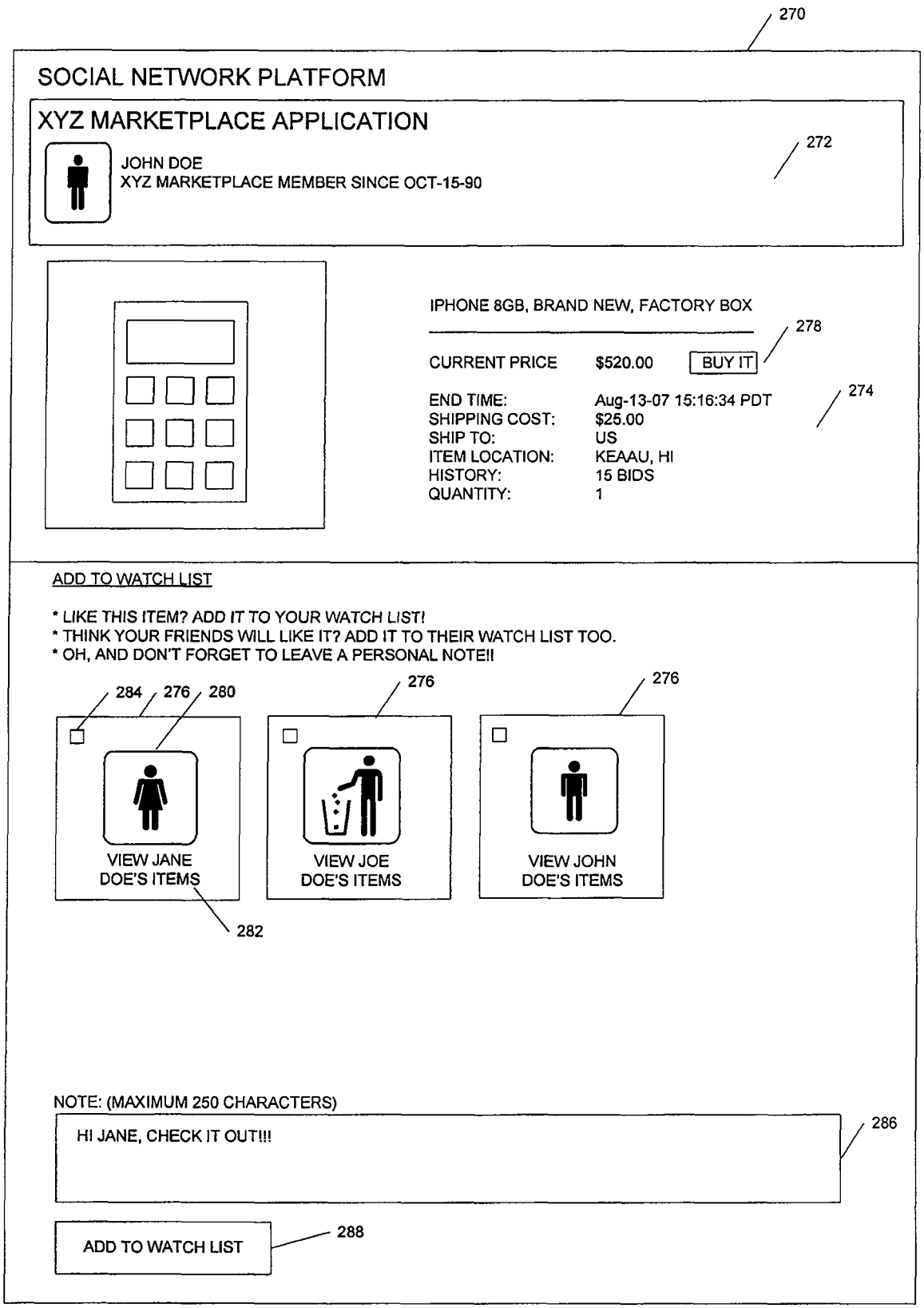

FIG. 12 is a diagram illustrating a user interface 270, according to an embodiment. The user interface 270 includes user interface elements 272 that describes the identity of the present user (e.g., John Doe) from the point of view of the network-based social platform 13 based on, for example, a user name and password. The user interface 270 further includes user interface elements 274 that describe a item (e.g., iPhone) for sale on the network-based marketplace 12, and user interface elements 276 that respectively correspond to "friends" of the user (e.g., John Doe).

The user interface elements 278 may be selected to click through to the network-based marketplace 12 and purchase the item (e.g., iPhone) on the user interface 270.

Each user interface element 276 may include user interface elements 280, 282 and 284. The user interface element 280 may be an image representing a user on the network-based social platform 13 and the user interface element 282 may be the name of the user. The user interface element 284 may be a checkbox that may be selected to add the item to the watch list(s) of the identified user(s). Further, a single request to add the item may be associated multiple selected checkboxes. Accordingly, selection of checkboxes associated with a first and second user may result in the addition of the identified item to the watch lists of the first and second user responsive to a selection of the user interface element 288. Further, the user interface element 282 may be selected to view the watch list associated with the identified user.

The user interface 270 further includes an input box 286 to receive an alphanumeric string, such as a personal note, from the first user (e.g., John Doe). The processing module 41 may receive the alphanumeric string and associate the alphanumeric string with the item (e.g., shopping information) on the watch lists identified via the checkboxes 284.

Figure 13:
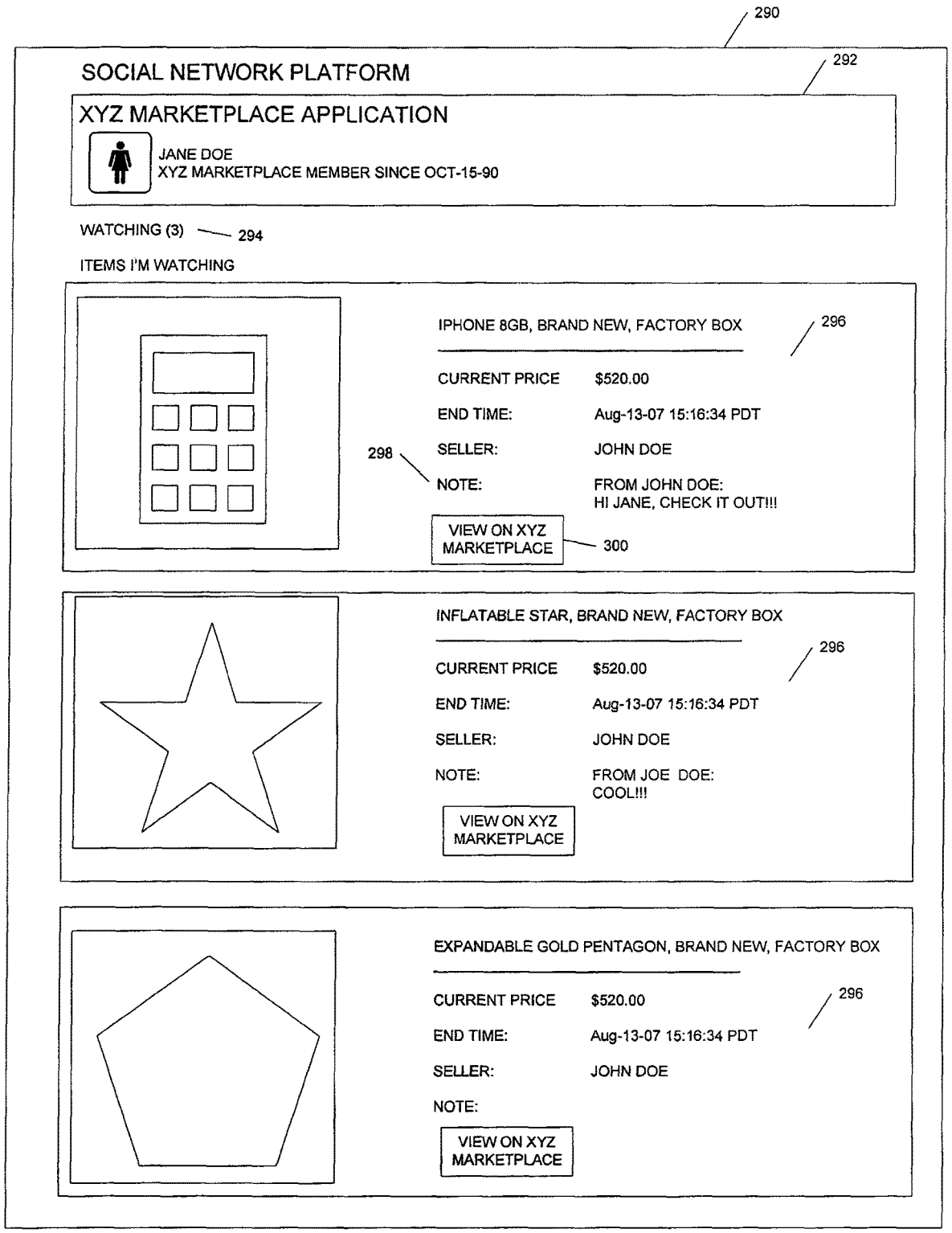

FIG. 13 is a diagram illustrating a user interface 290, according to an embodiment. The user interface 290 includes user interface elements 292 that describes the identity of the present user (e.g., Jane Doe) from the point of view of the network-based social platform 13 based on, for example, a user name and password. The user interface 290 further includes user interface elements 294 that may be a count of items on the watch list of the present user (e.g., Jane Doe), and one or more user interface elements 296 respectively describing items (e.g., iPhone) being watched. Each user interface element 296 may include a note 298 associated with an alphanumeric string from another user that added the item to the watch list. In one embodiment the note may be displayed only to the owner (e.g., Jane Doe) of the watch list. Each user interface element may further include a user interface element 300 that may be selected to click through to the network-based marketplace 12 and purchase the item or enter a bid for the item.

Figure 14:
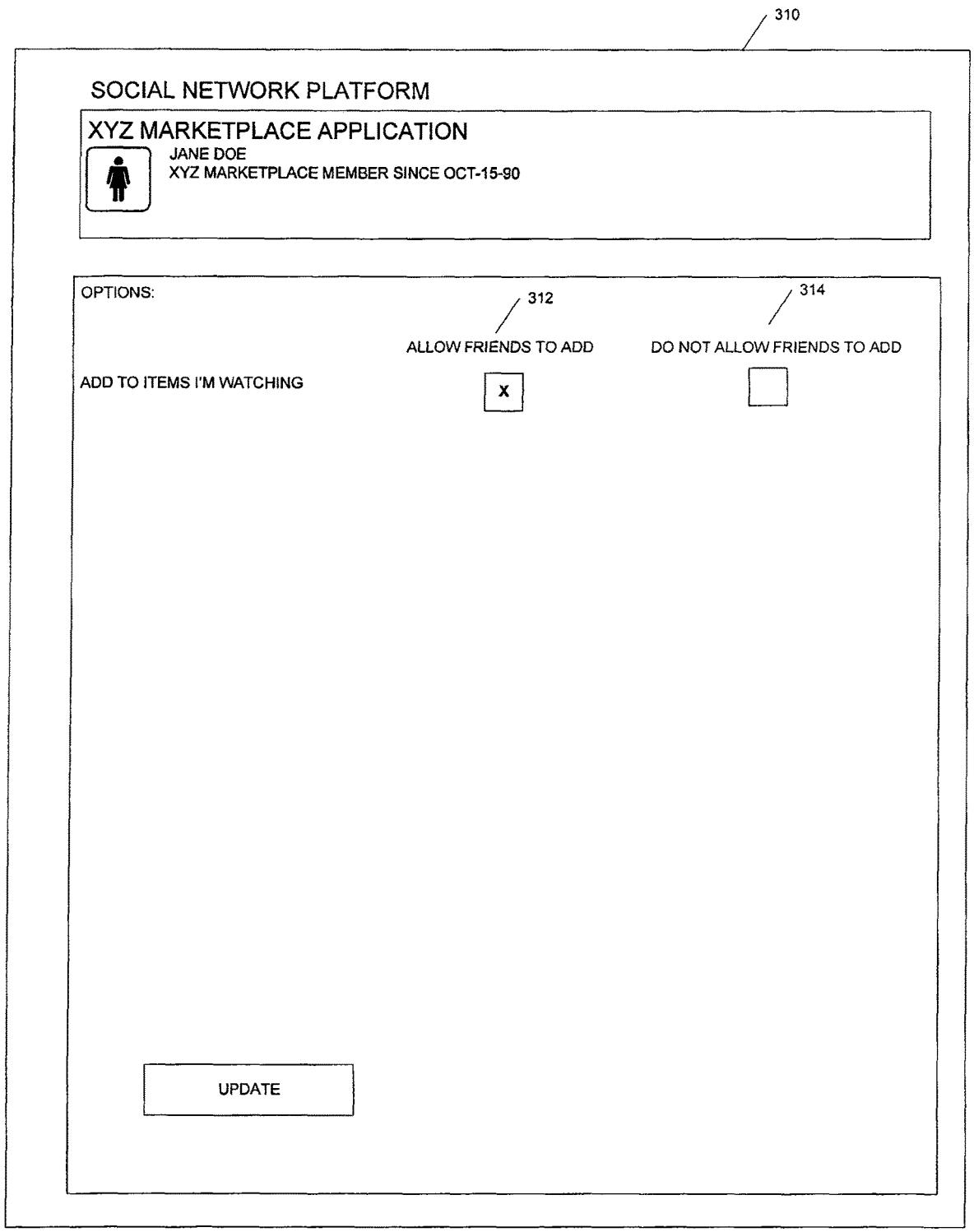

FIG. 14 is a diagram illustrating a user interface 310, according to an embodiment, to block adding items to a watch list. The user interface 310 may include mutually exclusive checkboxes 312 and 314 to respectively unblock or block the addition of items to the watch list of the user (e.g., Jane Doe).

Figure 15:
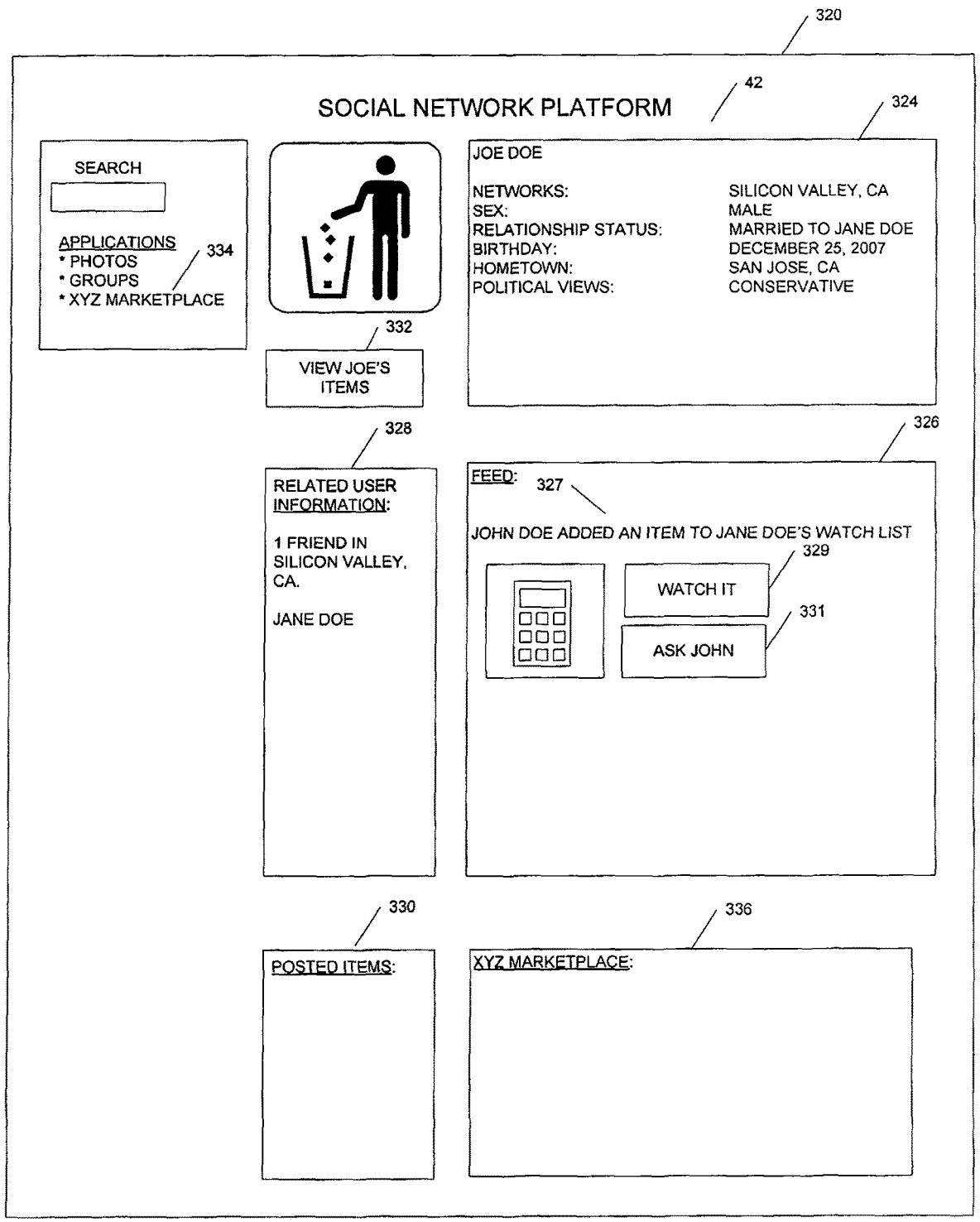

FIG. 15 is a diagram illustrating a user interface 320, according to an embodiment, of a user profile. The user profile 320 may include user profile information 42 for the user featured by the user profile. All user profile information 42 may be displayed to the user featured by the profile (e.g., Joe Doe). A portion of the user profile information 42 may be displayed to others users according to a status (e.g., "friend," "favorite friend"). The profile information 42 includes user information 324, event information 326, related user information 328 and posted information 330.

The user information 324 includes information about the user. The event information 326 includes events 327 that may be of interest to the user. In one embodiment an event may be an action performed by a "friend" or "favorite friend" of the user. For example, the event information 326 may include an event 327 that describes the addition of an item by a friend "John Doe" to a watch list of a friend "Jane Doe." Each event 327 may include a user interface element 329 that may be selected to add the item to the watch list of the user associated with the profile (e.g., "Joe Doe") and a user interface element 331 that may be selected to author a message that is communicated to the user that added the item (e.g., "John Doe").

Figure 16:
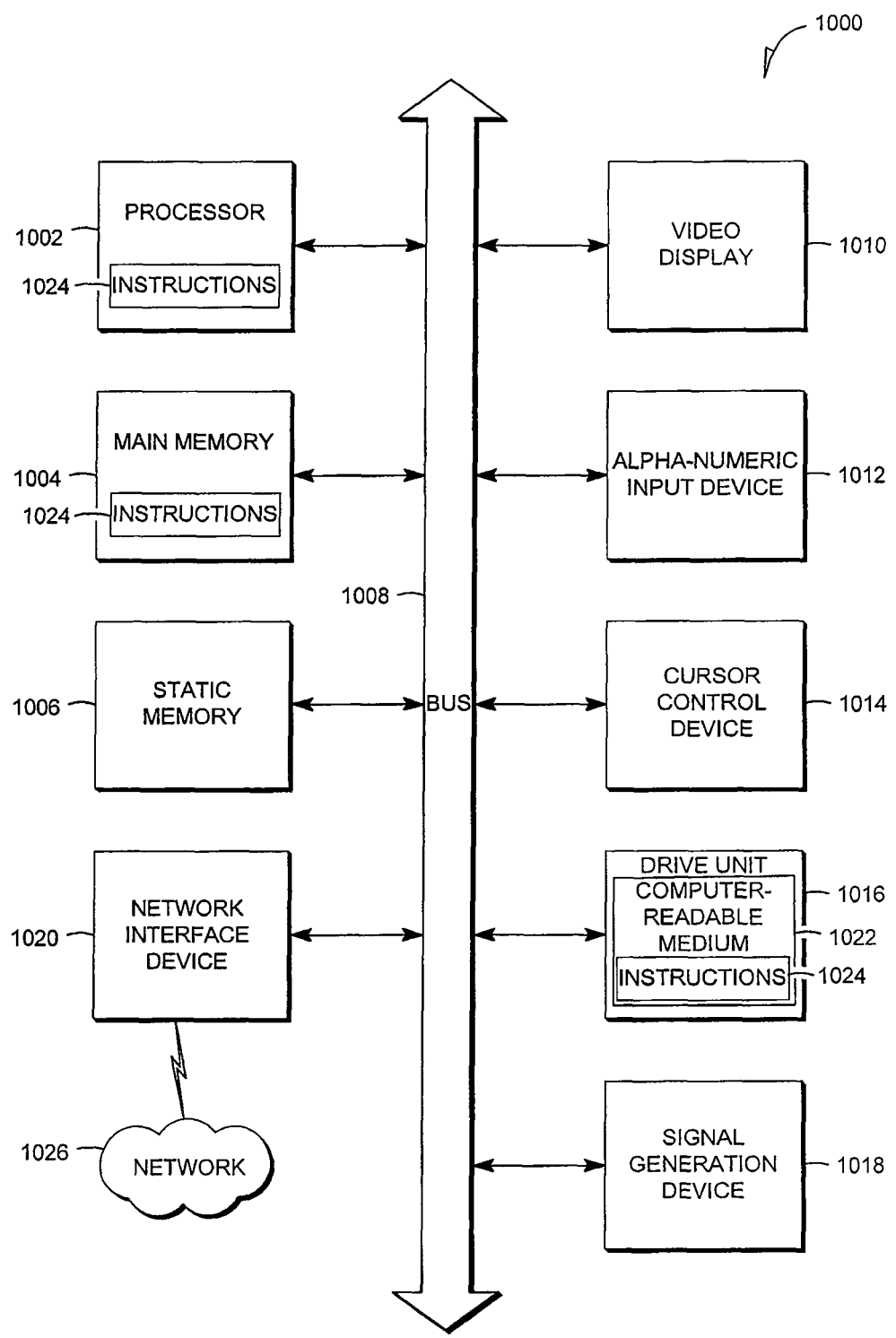
FIG. 16 is a block diagram of a machine, according to an example embodiment, including instructions to perform any one or more of the methodologies described herein.

FIG. 16 is a diagrammatic representation of a machine in the example form of a computer system 1000 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU) a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a cursor control device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions (e.g., software 1024) embodying any one or more of the methodologies or functions described herein. The software 1024 may also reside, completely or at least partially, within the main memory 1004 and/or within the processor 1002 during execution thereof by the computer system 1000, the main memory 1004 and the processor 1002 also constituting machine-readable media.

The software 1024 may further be transmitted or received over a network 1026 via the network interface device 1020.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals.

A Three-Tier Architecture

In some embodiments, a method is illustrated as implemented in a distributed or non-distributed software application designed under a three-tier architecture paradigm, whereby the various components of computer code that implement this method may be categorized as belonging to one or more of these three tiers. Some embodiments may include a first tier as an interface (e.g., an interface tier) that is relatively free of application processing. Further, a second tier may be a logic tier that performs application processing in the form of logical/mathematical manipulations of data inputted through the interface level, and communicates the results of these logical/mathematical manipulations to the interface tier, and/or to a backend, or storage tier. These logical/mathematical manipulations may relate to certain business rules, or processes that govern the software application as a whole. A third, storage tier, may be a persistent storage medium or, non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. This three-tier architecture may be implemented using one technology, or, as will be discussed below, a variety of technologies. This three-tier architecture, and the technologies through which it is implemented, may be executed on two or more computer systems organized in a server-client, peer to peer, or so some other suitable configuration. Further, these three tiers may be distributed between more than one computer system as various software components.

Modules, Components and Logic

Certain embodiments are described herein as including logic or a number of modules, components or mechanisms. A module, logic, component or mechanism (herein after collectively referred to as a "module") may be a tangible unit capable of performing certain operations and is configured or arranged in a certain manner. In example embodiments, one or more computer systems (e.g., a standalone, client or server computer system) or one or more components of a computer system (e.g., a processor or a group of processors) may be configured by software (e.g., an application or application portion) as a "module" that operates to perform certain operations as described herein.

In various embodiments, a "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g., configured by software) may be driven by cost and time considerations.

Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, a one module may perform an operation, and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

Component Design

Some example embodiments may include the above illustrated tiers, and processes or operations that make them up, as being written as one or more software components. Common too many of these components is the ability to generate, use, and manipulate data. These components, and the functionality associated with each, may be used by client, server, or peer computer systems. These various components may be implemented by a computer system on an as-needed basis. These components may be written in an object-oriented computer language such that a component oriented, or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique. These components may be linked to other components via various Application Programming interfaces (APIs), and then compiled into one complete server, client, and/or peer software application.

Further, these APIs may be able to communicate through various distributed programming protocols as distributed computing components.

Distributed Computing Components and Protocols

Some example embodiments may include remote procedure calls being used to implement one or more of the above illustrated components across a distributed programming environment as distributed computing components. For example, an interface component (e.g., an interface tier) may reside on a first computer system that is remotely located from a second computer system containing a logic component (e.g., a logic tier). These first and second computer systems may be configured in a server-client, peer-to-peer, or some other suitable configuration. These various components may be written using the above illustrated object-oriented programming techniques, and can be written in the same programming language, or a different programming language. Various protocols may be implemented to enable these various components to communicate regardless of the programming language used to write these components. For example, an component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the OSI model, or TCP/IP protocol stack model for defining the protocols used by a network to transmit data.

A System of Transmission Between a Server and Client

Some embodiments may utilize the OSI model or TCP/IP protocol stack model for defining the protocols used by a network to transmit data. In applying these models, a system of data transmission between a server and client, or between peer computer systems is illustrated as a series of roughly five layers comprising: an application layer, a transport layer, a network layer, a data link layer, and a physical layer. In the case of software having a three tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, Local Area Network (LAN), Wide Area Network (WAN), or some other suitable network. In some cases, internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology), or structures.

The Abstract of the Disclosure is provided to comply with 37 C.F.R. § 1.72(b), requiring an abstract that may allow the reader to quickly ascertain the nature of the technical disclosure. It is submitted with the understanding that it may not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method, comprising:
   receiving, in a user interface associated with an online marketplace, a selection of at least one item, the at least one item being assigned an identifier provided by the online marketplace;
   displaying, in the user interface, a selectable element that enables a first user to share information about the at least one item with a second user on a social media network;
   in response to receiving a selection of the selectable element, determining the at least one item is allowed to be shared with the second user on a social media network based on profile information of the second user; and
   in response to receiving a selection of the selectable element, providing shared information about the at least one item to the social media network, wherein the shared information comprises a second user interface element click through to the online marketplace based upon the identifier assigned to the at least one item.

2. The method of claim 1, wherein the at least one item is added to a list associated with the social media network.

3. The method of claim 1, wherein the click through redirects the second user to the online marketplace.

4. The method of claim 1, wherein the at least one item is grouped with other items that are similar to the at least one item.

5. The method of claim 1, wherein the first user has a predefined relationship in the social media network with the second user.

6. The method of claim 1, wherein the shared information is provided to the social media network via a web interface.

7. The method of claim 1, further comprising in response to receiving a selection of the selectable element, determining the first user is allowed to share with the second user on a social media network based on the profile information of the second user.

8. A system comprising:
   at least one processor; and
   memory encoding computer executable instructions that, when executed by the at least one processor, perform operations comprising:
      receiving, in a user interface associated with an online marketplace, a selection of at least one item, the at least one item being assigned an identifier provided by the online marketplace;
      displaying, in the user interface, a selectable element that enables a first user to share information about the at least one item with a second user on a social media network;
      in response to receiving a selection of the selectable element, determining the first user is allowed to share the at least one item with the second user on a social media network based on profile information of the second user; and
      in response to receiving a selection of the selectable element, providing shared information about the at least one item to the social media network, wherein the shared information comprises a first user interface element describing the at least one item, and a second user interface element click through to the online marketplace based upon the identifier assigned to the at least one item.

9. The system of claim 8, wherein the at least one item is added to a list associated with the social media network.

10. The system of claim 8, wherein the click through redirects the second user to the online marketplace.

11. The system of claim 8, wherein the at least one item is grouped with other items that are similar to the at least one item.

12. The system of claim 8, wherein the first user has a predefined relationship in the social media network with the second user.

13. The system of claim 8, wherein the shared information is provided to the social media network via a web interface.

14. The system of claim 8, further comprising in response to receiving a selection of the selectable element, determining the first user is allowed to share with the second user on a social media network based on the profile information of the second user.

15. A non-transitory computer-readable storage medium having embedded therein a set of instructions which, when executed by one or more processors of a computer, causes the computer to execute operations comprising:
    receiving, in user interface associated with an online marketplace, a selection of at least one item, the at least one item being assigned an identifier provided by the online marketplace;
    displaying, in the user interface, a selectable element that enables a first user to share information about the at least one item with a second user on a social media network;
    in response to receiving a selection of the selectable element, checking block information from user profile information of the second user and verifying that the block information is not associated with the first user;
    in response to receiving a selection of the selectable element, providing shared information about the at least one item to the social media network, wherein the shared information comprises a first user interface element describing the at least one item, and a second user interface element click through to the online marketplace based upon the identifier assigned to the at least one item.

16. The non-transitory computer-readable storage medium of claim 15, wherein the at least one item is added to a list associated with the social media network.

17. The non-transitory computer-readable storage medium of claim 15, wherein the click through redirects the second user to the online marketplace.

18. The non-transitory computer-readable storage medium of claim 15, wherein the at least one item is grouped with other items that are similar to the at least one item.

19. The non-transitory computer-readable storage medium of claim 15, wherein the shared information is provided to the social media network via a web interface.

20. The non-transitory computer-readable storage medium of claim 15, further comprising in response to receiving a selection of the selectable element, determining the at least one item is allowed to be shared with the second user on a social media network based on the user profile information of the second user.

* * * * *